US012759330B2

(12) United States Patent
Minemura et al.

(10) Patent No.: US 12,759,330 B2
(45) Date of Patent: Oct. 13, 2026

(54) RECORDING DEVICE, RECORDING DEVICE CONTROL PROGRAM, AND RECORDING DEVICE CONTROL METHOD

(71) Applicant: SEIKO EPSON CORPORATION, Tokyo (JP)

(72) Inventors: Hidefumi Minemura, Shiojiri (JP); Masaki Ito, Fujimi-Machi (JP); Kenichi Furuya, Shiojiri (JP); Keisuke Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/326,959

(22) Filed: Sep. 12, 2025

(65) Prior Publication Data

US 2026/0077974 A1 Mar. 19, 2026

(30) Foreign Application Priority Data

Sep. 13, 2024 (JP) ................................ 2024-158933

(51) Int. Cl.
*B41J 29/38* (2006.01)

(52) U.S. Cl.
CPC ........... *B41J 29/38* (2013.01); *B65H 2403/20* (2013.01); *B65H 2403/42* (2013.01); *B65H 2403/51* (2013.01); *B65H 2405/324* (2013.01); *B65H 2557/61* (2013.01); *B65H 2557/63* (2013.01); *B65H 2601/12* (2013.01); *B65H 2801/03* (2013.01)

(58) Field of Classification Search
CPC .......... B65H 2405/324; B65H 2557/63; B65H 2557/61; B65H 2403/40; B65H 2403/51; B65H 2403/20; B65H 2403/42; B65H 2403/513
See application file for complete search history.

(56) References Cited

U.S. PATENT DOCUMENTS

| | | | | |
|---|---|---|---|---|
| 10,124,615 | B2 * | 11/2018 | Matsumoto ............ | B65H 31/00 |
| 11,724,526 | B2 * | 8/2023 | Minemura ............... | B41J 13/02 347/16 |
| 2023/0219355 | A1 * | 7/2023 | Minemura ............... | B41J 11/00 347/5 |

FOREIGN PATENT DOCUMENTS

| | | |
|---|---|---|
| JP | 2023101107 A | 7/2023 |

* cited by examiner

*Primary Examiner* — Jeremy R Severson
(74) *Attorney, Agent, or Firm* — CHIP LAW GROUP

(57) ABSTRACT

The control section of the recording device can execute a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of holding an amount obtained by subtracting the adjustment amount mc from the reference movement amount M after the adjustment as a new reference movement amount M when the power transmission section is switched from the power non-transmission state to the power transmission state as a result of the retry step.

9 Claims, 31 Drawing Sheets

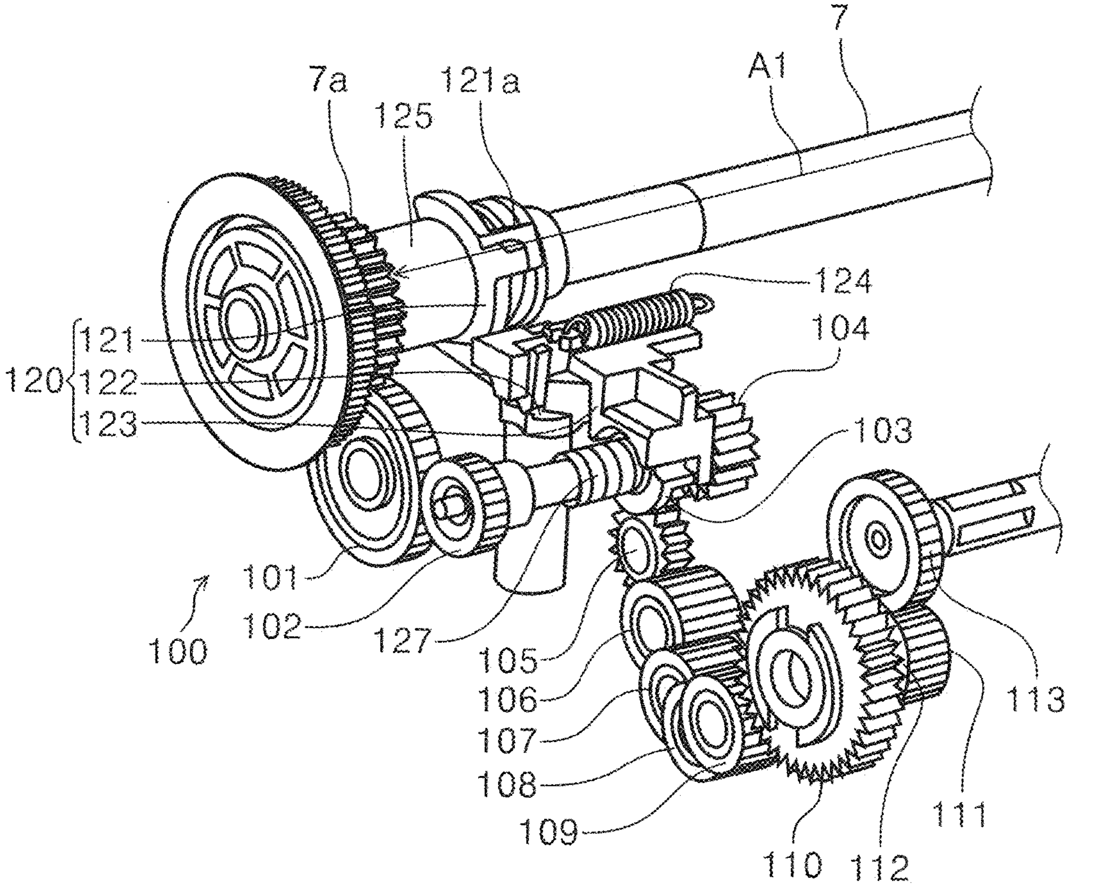
FIG. 11
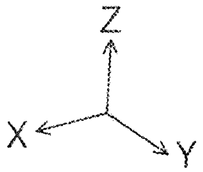

RECORDING DEVICE, RECORDING DEVICE CONTROL PROGRAM, AND RECORDING DEVICE CONTROL METHOD

The present application is based on, and claims priority from JP Application Serial Number 2024-158933, filed Sep. 13, 2024, the disclosures of which is hereby incorporated by reference herein in its entirety.

BACKGROUND

1. Technical Field

The present disclosure relates to a recording device for recording on a medium. The present disclosure also relates to a recording device control program. The present disclosure also relates to a recording device control method.

2. Related Art

JP-A-2023-101107 disclose a recording device including a power transmission section that switches power transmission from a motor to a medium receiving tray The power transmission section can take a power transmission state in which power is transmitted and a power non-transmission state in which power is not transmitted. The power transmission section switches the state by the operation of a carriage on which the recording head is mounted.

The power transmission section includes a cam having a cam surface and a pin disposed on the cam surface. The cam surface is provided with a flat surface section where the pin is located when the power transmission section is in the power non-transmission state, and a pin holding section that holds the pin when the power transmission section is in the power transmission state. When the power transmission section is switched from the power non-transmission state to the power transmission state and the power transmission state is held, the carriage is moved by a predetermined amount to move the pin from the flat surface section to the pin holding section. When the pin is held by the pin holding section, the power transmission state is maintained even when the carriage is separated from the power transmission section.

Sometimes although the pin moves from the flat surface section to the pin holding section by the movement of the carriage, the pin is not positioned in the pin holding section due to a component tolerance, an assembly error, or the like, and switching of power transmission may fail.

SUMMARY

To solve the above problem, a recording device of the present disclosure includes a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the control section is configured to execute a correction mode for correcting a reference movement amount M of the carriage for moving the switching section from the first position to the second position the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

The present disclosure is a non-transitory computer-readable storage medium storing a computer program that is executed by a control section of a recording device, the recording device including a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the control program comprising: executing a correction mode by a computer to correct a reference movement amount M of the carriage for moving the switching section from the first position to the second position, the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of holding an amount obtained by subtracting the adjustment amount mc from the adjusted reference movement amount M after the adjustment as a new reference movement amount M when the power transmission section is switched from the power non-transmission state to the power transmission state as a result of the retry step.

The present disclosure is a recording device control method, the recording device including a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the recording device control method comprising: a correction mode for correcting a reference movement amount M of the carriage for moving the switching section from the first position to the second position, the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

BRIEF DESCRIPTION OF THE DRAWINGS

FIG. 11 is a perspective view of a power transmission section of the recording device of FIG. 1, and is a view showing a state in which a switching lever section is at a contact position.

DESCRIPTION OF EMBODIMENTS

Figure 1:
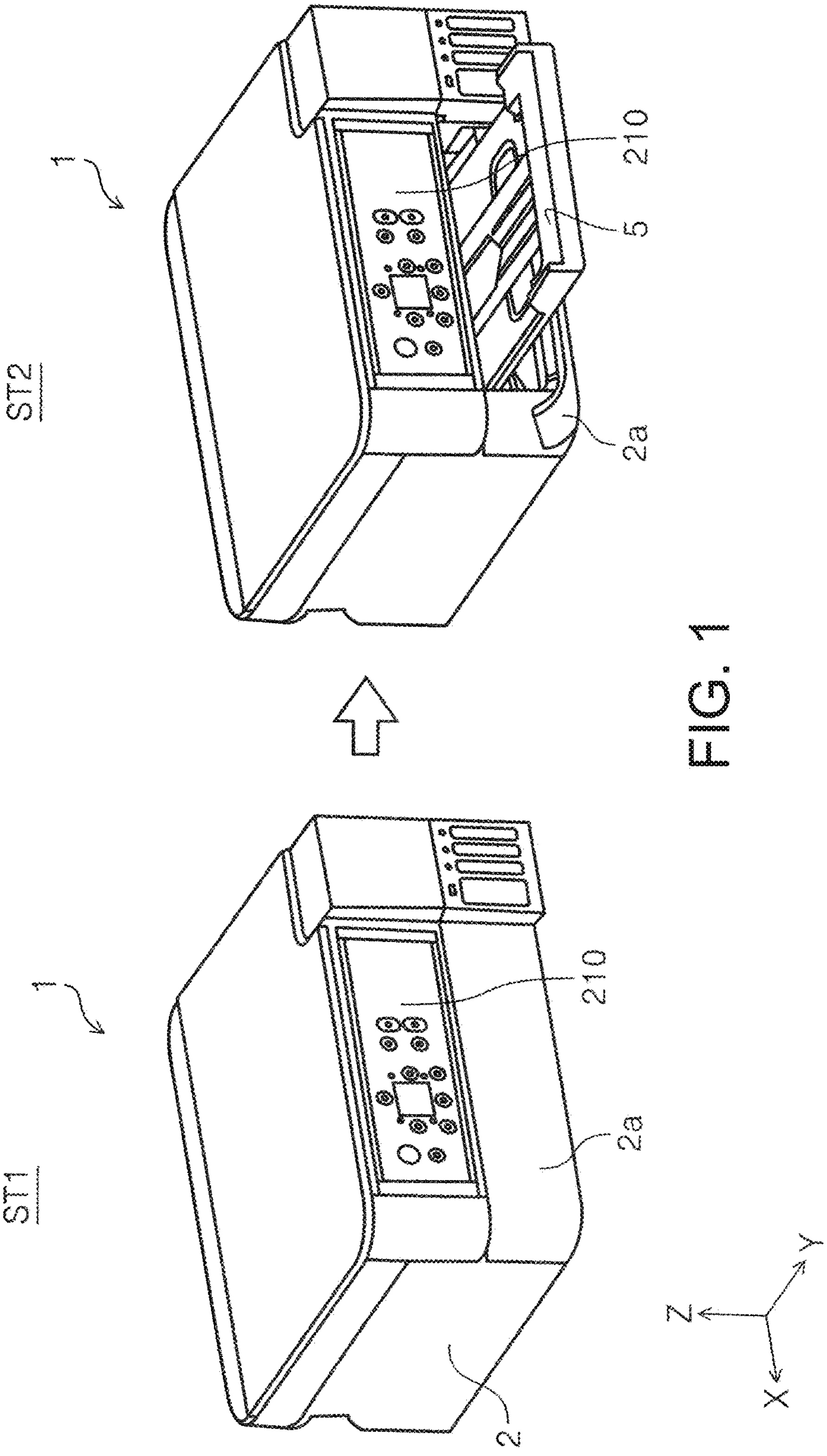
FIG. 1 is a schematic diagram of a recording device according to a first embodiment of the present disclosure.

Hereinafter, the present disclosure will be generally described.

A recording device according to a first aspect includes: a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the control section is configured to execute a correction mode for correcting a reference movement amount M of the carriage for moving the switching section from the first position to the second position the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

When the power transmission section is not switched from the power non-transmission state to the power transmission state as a result of moving the carriage based on the reference movement amount M, that is, when the switching of the power transmission fails, it is conceivable that the cam contact section has entered the guide path by moving too far in the first direction from the second cam surface.

According to the aspect, since the reference movement amount M of the carriage for moving the switching section from the first position to the second position is reduced by the correction mode, it is possible to suppress a failure in switching of the power transmission.

When the power transmission section is switched from the power non-transmission state to the power transmission state as a result of the retry step, the cam contact section may be located at a position where the cam contact section is located on the second cam surface but may enter the guide path, that is, an unstable position. In such a case, there is a high possibility that the switching of the power transmission will fail in the future.

However, according to the present aspect, when the power transmission section is switched from the power non-transmission state to the power transmission state as a result of the retry step, the amount obtained by subtracting the adjustment amount mc from the reference movement amount M after the adjustment is held as a new reference movement amount M, and thus the cam contact section can be moved to a stable position on the second cam surface. As a result, it is possible to suppress a failure in switching the power transmission.

A second aspect is an aspect according to the first aspect, wherein when the power transmission section is switched from the power non-transmission state to the power transmission state as a result of performing the power switching step a first time, the correction mode includes an adjustment step of performing the power switching step with a movement amount obtained by adding an adjustment amount mb to the reference movement amount M after the adjustment as a reference movement amount M and the control section shifts to the retry step when the power transmission section is not switched from the power non-transmission state to the power transmission state as a result of the adjustment step in the correction mode.

When the power transmission section is switched from the power non-transmission state to the power transmission state as a result of the first power switching step, the cam contact section may be located at a position where the cam contact section is located on the second cam surface but may enter the guide path, that is, an unstable position. In such a case, there is a high possibility that the switching of the power transmission will fail in due course, and therefore, it is desirable to adjust the reference movement amount M.

According to this aspect, when the power transmission section is switched from the power non-transmission state to the power transmission state as a result of the first power switching step, the power switching step is performed using the movement amount obtained by adding the adjustment amount mb to the reference movement amount M as the reference movement amount M after adjustment. By this, it can be expected that the cam contact section moved too far in the first direction from the second cam surface and will enter the guide path. That is, the switching of the power transmission can be intentionally made to fail.

Then, by performing the retry step and the reference movement amount correction step, it is possible to suppress a failure in switching the power transmission.

A third aspect is an aspect according to the first aspect, wherein when the power transmission section is not switched from the power non-transmission state to the power transmission state as a result of the retry step in the correction mode, the control section repeatedly executes the retry step with a retry number Na as a limit and when the power transmission section is not switched from the power non-transmission state to the power transmission state even after the retry step is executed the number of retries Na, the control section determines that an error has occurred and ends the correction mode.

When the power transmission section is not switched from the power non-transmission state to the power transmission state even after the retry step is repeated, there is a possibility that a mechanical abnormality has occurred that cannot be handled by some control. In such a case, repeating the retry step more than necessary leads to unnecessary time consumption.

According to this aspect, when the power transmission section is not switched from the power non-transmission state to the power transmission state as a result of the retry step, the retry step is repeatedly executed with the number of retries Na as a limit, and thus it is possible to suppress unnecessary time consumption.

Note that the present aspect is not limited to the first aspect and may be dependent on the second aspect.

A fourth aspect is an aspect according to the third aspect, wherein when the power transmission section is not switched from the power non-transmission state to the power transmission state even if the retry step is executed the number of retries Na in the correction mode, the control section holds the latest reference movement amount M as a new reference movement amount M and further, when the control section executes the correction mode again, the control section compares the reference movement amount M with a threshold value Sd, and when the reference movement amount M is equal to or less than the threshold value Sd, the control section executes the correction mode by setting an amount obtained by adding an adjustment amount mf to the reference movement amount M as a new reference movement amount M.

When the power transmission section is not switched from the power non-transmission state to the power transmission state even after the correction mode is executed once and the retry step is executed the number of retries Na, the correction mode is terminated. In this case, it is conceivable that the cam contact section could not reach the second cam surface from the beginning. Therefore, in the case where the correction mode is executed again, even if the latest reference movement amount M is used as it is, the cam contact section cannot reach the second cam surface from the first cam surface, and there is a possibility that the same result occurs.

According to the present aspect, when the correction mode is executed again, the control section compares the reference movement amount M with the threshold value Sd, and when the reference movement amount M is equal to or less than the threshold value Sd, the control section executes the correction mode with an amount obtained by adding the adjustment amount mf to the reference movement amount M as a new reference movement amount M. Therefore, it can be expected that the cam contact section reaches the second cam surface from the first cam surface, and the reference movement amount M can be corrected to an appropriate value by the correction mode.

A fifth aspect is an aspect according to the first aspect, wherein the power transmission section includes a first gear configured to transmit a gear of the power source to the driven section and a second gear that is movable in a movement direction of the carriage, disengages from the first gear when the switching section is located at the first position, and engages with the first gear when the switching section is located at the second position.

According to this aspect, the power non-transmission state and the power transmission state can be switched with a simple configuration by engaging and disengaging the first gear and the second gear.

Note that the present aspect is not limited to the first aspect and may be according to any of the second to fourth aspects.

A sixth aspect is an aspect according to any one of the first to fifth aspects, the recording device including a discharge section that discharges the medium on which recording has been performed by the recording section and a medium receiving tray that receives the medium discharged by the discharge section, the medium receiving tray being displaceable between a storage position and a protruding position protruding from the storage position in a discharge direction of the medium, wherein the driven section is the medium receiving tray.

According to the present aspect, in the configuration in which the driven portion is a medium receiving tray that receives the medium discharged by the discharge section, the operational effect of any one of the first to fifth aspects described above is obtained.

A seventh aspect is an aspect according to the sixth aspect, the recording device further including a tray detection section that detects a position of the medium receiving tray, wherein the control section determines whether the power transmission section is in the power transmission state or the power non-transmission state based on detection information of the tray detection section.

According to the aspect, since the tray detection section that detects the position of the medium receiving tray is included, and the control section determines whether the power transmission section is in the power transmission state or the power non-transmission state based on the detection information of the tray detection section, it is not necessary to provide a dedicated detection section that detects the state of the power transmission section, and it is possible to suppress an increase in the cost of the device.

An eighth aspect is a non-transitory computer-readable storage medium storing a computer program that is executed by a control section of a recording device, the recording device including a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the control program comprising: executing a correction mode by a computer to correct a reference movement amount M of the carriage for moving the switching section from the first position to the second position, the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of holding an amount obtained by subtracting the adjustment amount mc from the adjusted reference movement amount M after the adjustment as a new reference movement amount M when the power transmission section is switched from the power non-transmission state to the power transmission state as a result of the retry step.

According to the present aspect, the same operational effects as those of the first aspect described above can be obtained.

A ninth aspect is a recording device control method, the recording device including a power source; a power transmission section configured to be switched between a power transmission state in which power of the power source is transmitted to a driven section and a power non-transmission state in which power is not transmitted to the driven section; a carriage that includes a recording section that performs recording on a medium and is movable in a first direction intersecting a transport direction of the medium and a second direction opposite to the first direction; and the control section that controls an operation of the carriage, wherein the power transmission section includes a switching section that switches from the power non-transmission state to the power transmission state by moving from a first position to a second position in the first direction with respect to the first position in accordance with movement of the carriage in the first direction, and a cam mechanism configured to hold the switching section at the second position, the cam mechanism includes a cam having a cam surface and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the recording device control method comprising: a correction mode for correcting a reference movement amount M of the carriage for moving the switching section from the first position to the second position, the correction mode includes a power switching step of moving the carriage based on the reference movement amount M, a retry step of performing the power switching step with an amount obtained by subtracting an adjustment amount ma from the reference movement amount M after the adjustment as a reference movement amount M when the power transmission section is not switched from the power non-transmission state to the power transmission state as a result of the power switching step, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

According to the present aspect, the same operational effects as those of the first aspect described above can be obtained.

Hereinafter, the present disclosure will be described in detail.

In the following description, three axes orthogonal to each other are referred to as an X-axis, a Y-axis, and a Z-axis, respectively, as shown in each drawing. The Z-axis direction corresponds to a vertical direction, that is, a direction in which gravity acts. The X-axis direction and the Y-axis direction correspond to horizontal directions. In each drawing, the directions indicated by the arrows of the three axes (X, Y, Z) are the +directions of the respective directions. For example, the X-axis direction corresponds to the reciprocating direction of the carriage 3. The +X direction is an example of a first direction and corresponds to a side on which the power transmission section 100 is provided. The −X direction is an example of a second direction and corresponds to the home position side of the carriage 3.

The +Y direction corresponds to the discharge direction of the medium receiving tray 5.

As showed in FIG. 1, a recording device 1 according to present embodiment includes a housing 2. A front cover 2*a* is provided as a part of the housing 2. The recording device 1 of the present embodiment can change the state from the state ST1 to the state ST2 in FIG. 1. Specifically, the recording device 1 is configured such that the medium receiving tray 5 can be displaced between a storage position and a protruding position by a medium feed motor 6 shown in FIG. 2 and the like. Note that hereinafter, the medium feed motor 6 is abbreviated as a "PF motor 6".

Figure 2:
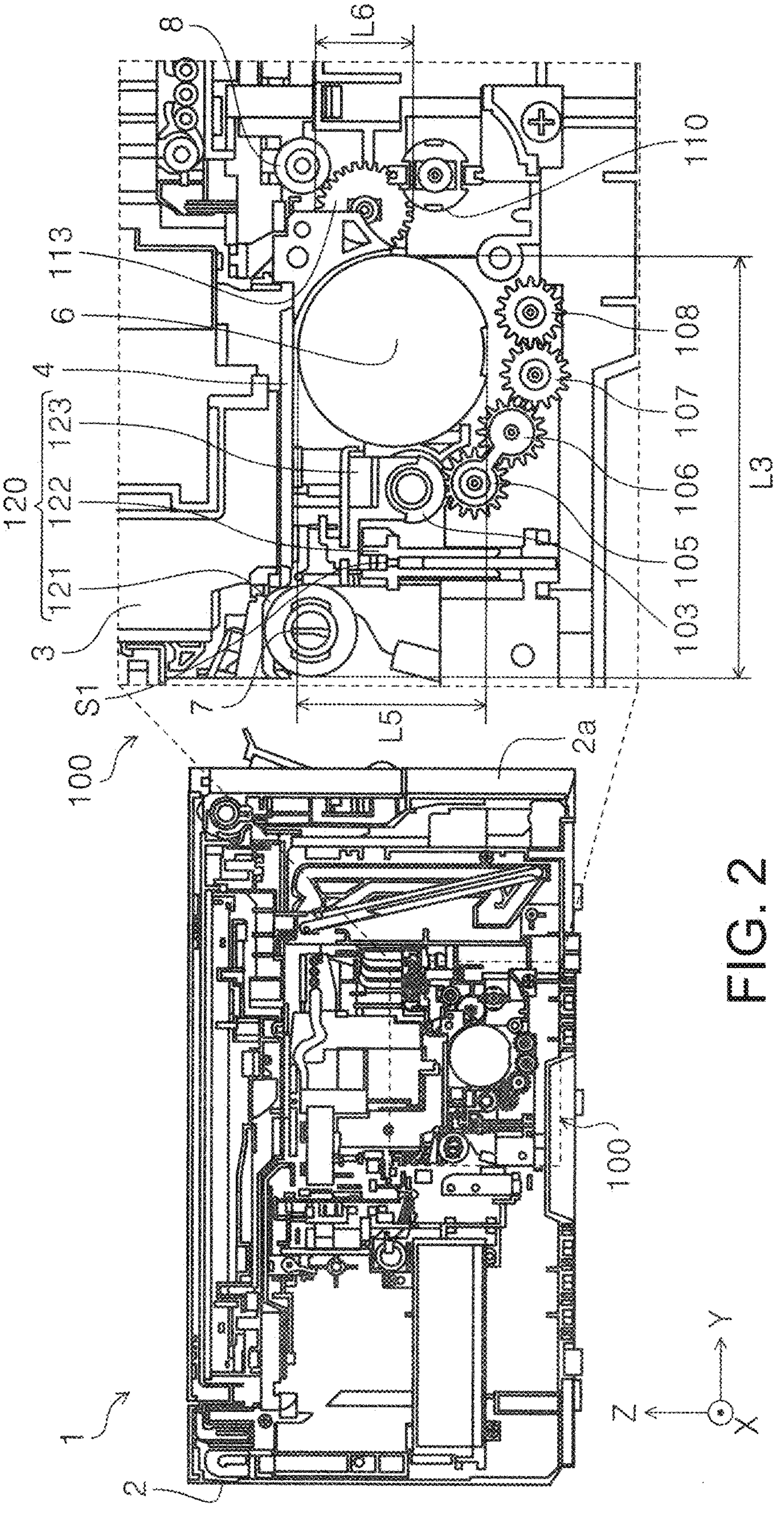
FIG. 2 is a side sectional view showing internal configuration of the recording device in FIG. 1, and is a diagram showing a portion thereof in an enlarged manner.
Figure 9:
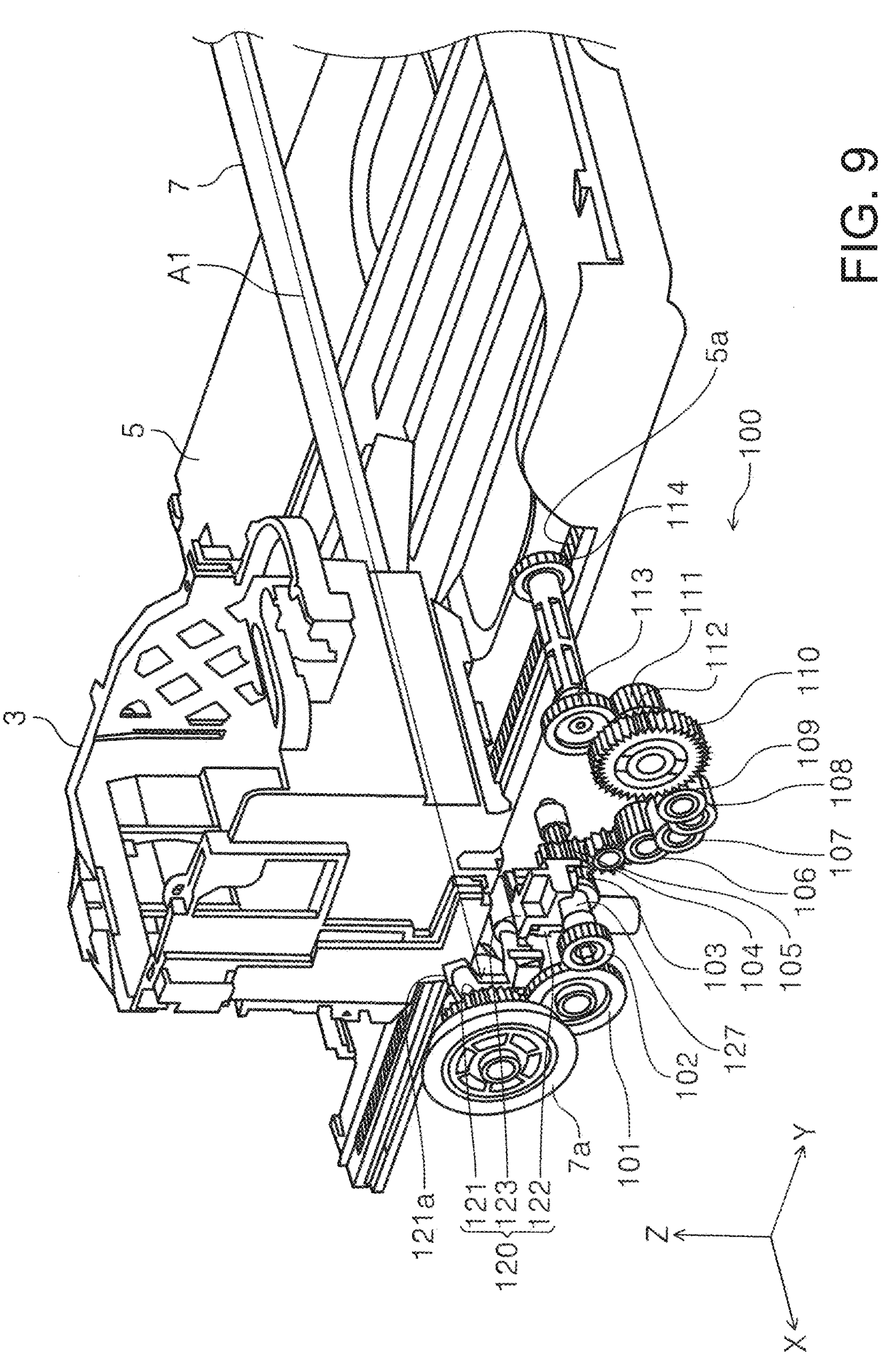
FIG. 9 is a perspective view showing a power transmission section, a carriage, and a medium receiving tray of the recording device of FIG. 1, and is a diagram showing a state in which the carriage is on the power transmission section side within a reciprocating movement range and a switching lever section is at a contact position.
Figure 10:
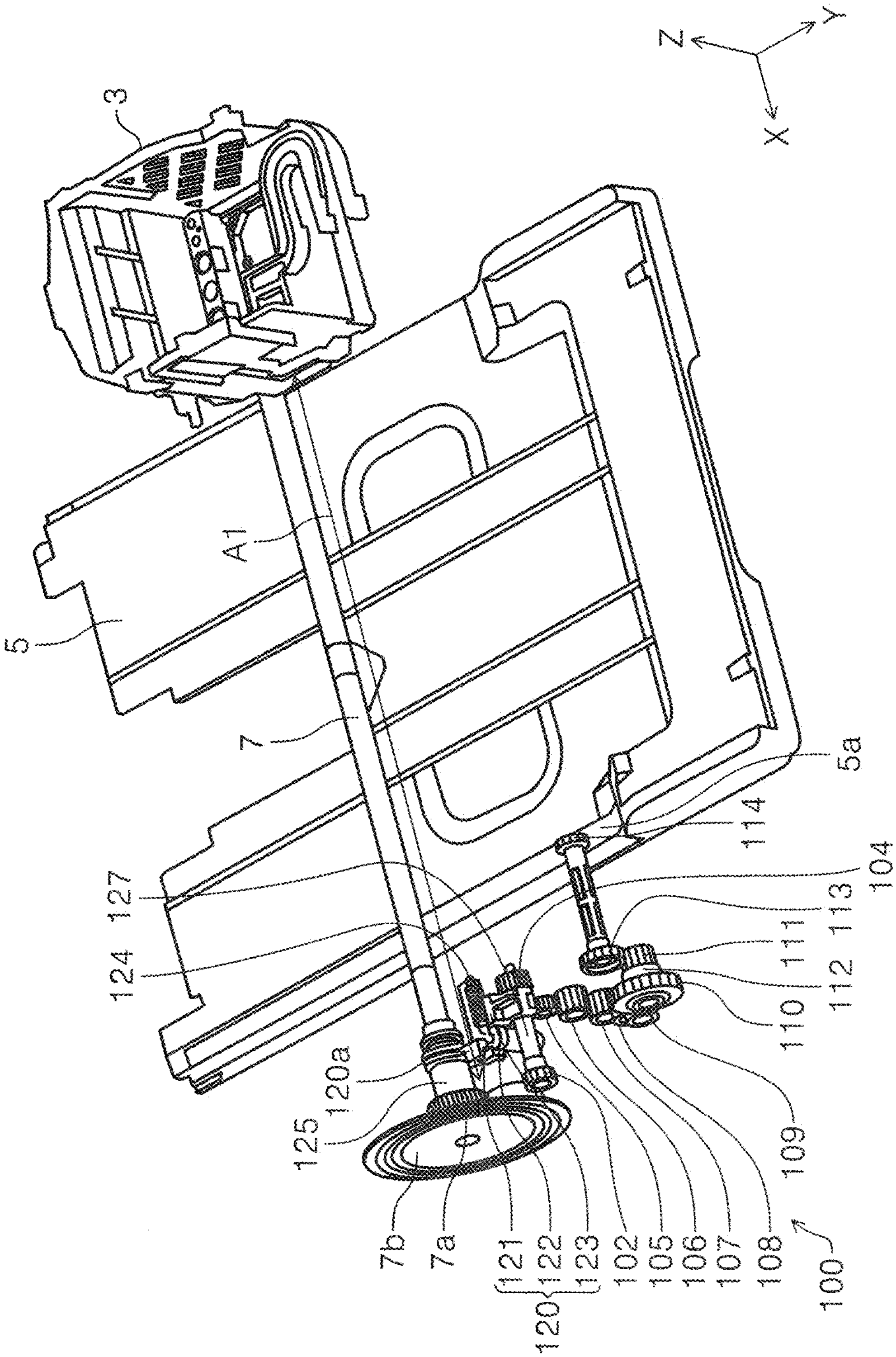
FIG. 10 is a perspective view showing a power transmission section, a carriage, and a medium receiving tray of the recording device of FIG. 1, and is a diagram showing a state in which the carriage is at a home position on a side opposite to a power transmission section side within a reciprocating movement range.

Here, the recording device 1 of the present embodiment includes a carriage 3, which reciprocates along the X axis direction inside a housing 2 as shown in FIGS. 9 and 10, and a recording head 4, which is an example of a recording section that is mounted on the carriage 3 and that performs recording on a medium as shown in FIG. 2. As shown in FIG. 2 and the like, the recording device 1 of the present embodiment includes, inside the housing 2, a transport roller 7 that transports the medium and a discharge roller 8 as a discharge section that discharges the medium on which recording is performed. The recording device 1 of the present embodiment includes, inside the housing 2, a medium receiving tray 5 that receives the medium discharged by the discharge roller 8 as shown in FIGS. 9 and 10 and the like, and the PF motor 6 that is the power source of the transport roller 7 and the discharge roller 8 as shown in FIG. 2 and the like. Note that as will be described in detail later, the PF motor 6 is also a power source of the medium receiving tray 5.

Figure 6:
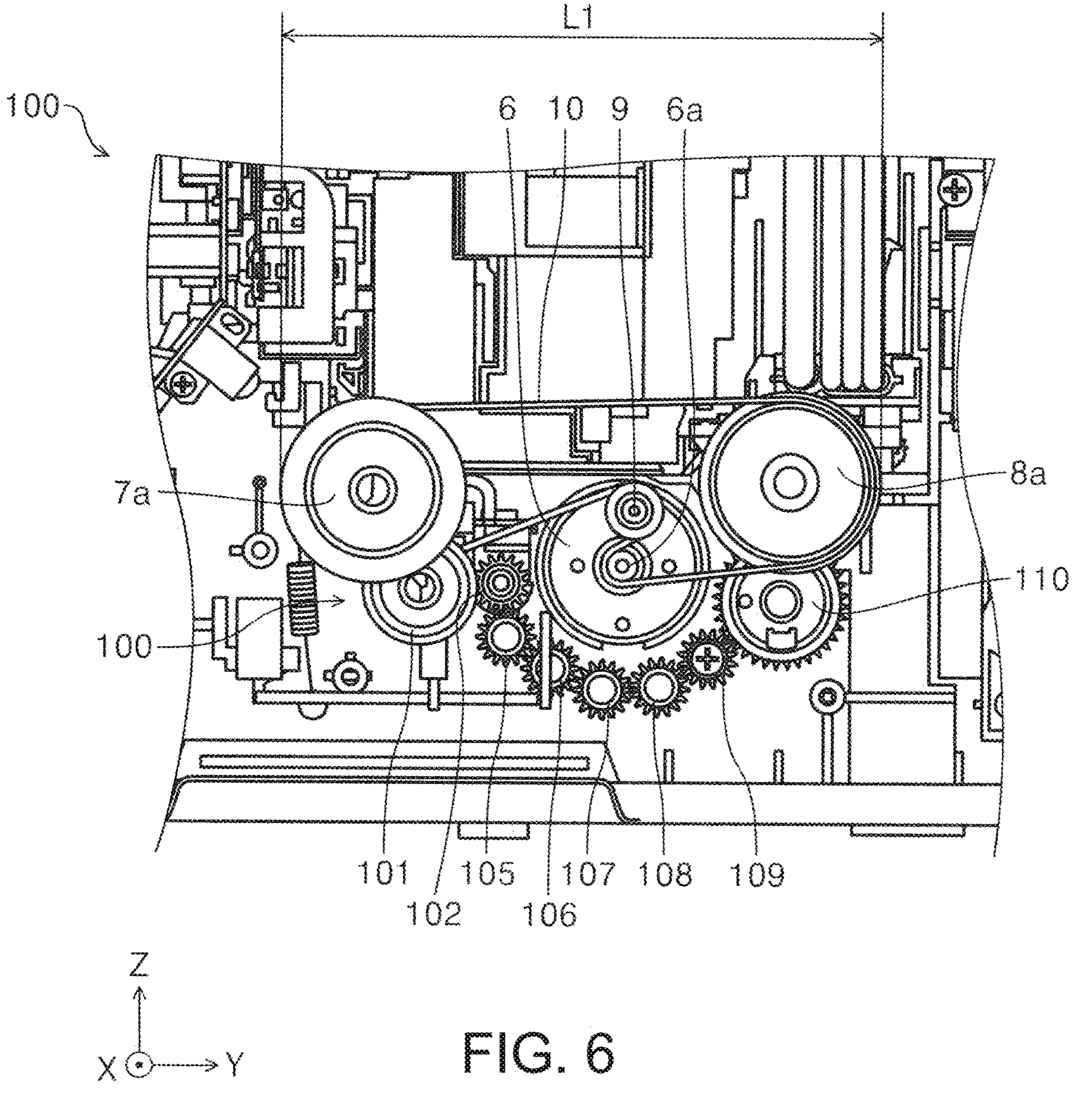
FIG. 6 is a side sectional view showing the periphery of a power transmission section of the recording device in FIG. 1.
Figure 7:
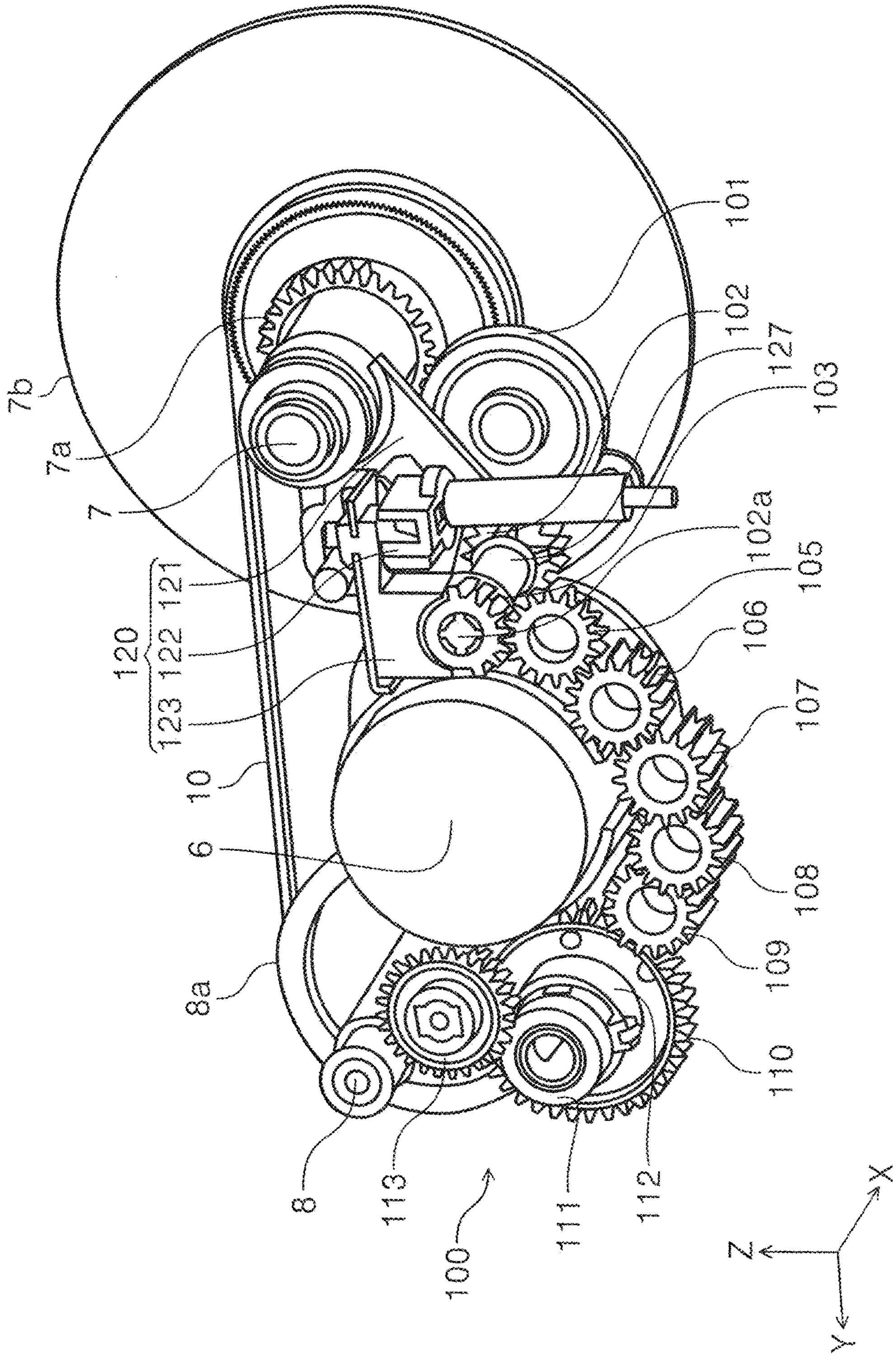
FIG. 7 is a perspective view showing a power transmission section and a motor of the recording device of FIG. 1.
Figure 12:
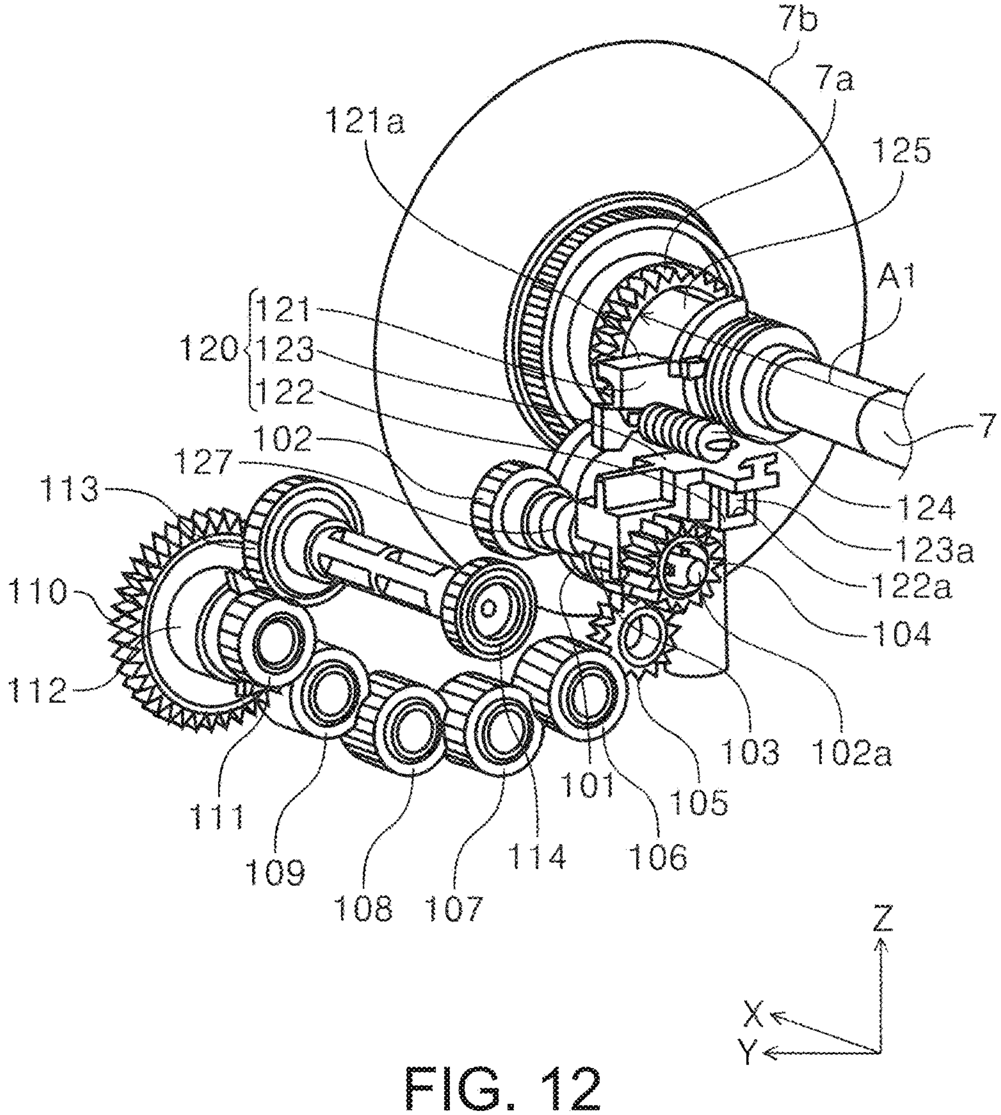
FIG. 12 is a perspective view of the power transmission section of the recording device of FIG. 1 as viewed from an angle different from that of FIG. 11, and is a view showing a state where the switching lever section is at a non-contact position.

The transmission of power from the PF motor 6 to the transport roller 7 and the discharge roller 8 is performed as follows. As illustrated in FIG. 6, a motor pulley 6*a* is attached to the PF motor 6. A belt 10 is wound around the motor pulley 6*a*. The belt 10 is wound around the motor pulley 6*a*, and also around a transport roller pulley 7*a* provided on the transport roller 7, the discharge roller pulley 8*a* provided on the discharge roller 8, and a pulley 9. The motor pulley 6*a* rotates as the rotation shaft of the PF motor 6 rotates, the belt 10 rotates accordingly, and the transport roller 7 and the discharge roller 8 rotate as the transport roller pulley 7*a* and the discharge roller pulley 8*a* rotate. Note that as illustrated in FIGS. 7 and 12, the transport roller 7 is provided with an encoder scale 7*b* constituting a rotary encoder 211 (refer to FIG. 21) that detects the rotation of the transport roller 7.

Here, as described above, the medium receiving tray 5 can take the storage position and the protruding position, which is displaced from the storage position in the discharge direction of the medium. Furthermore, the recording device 1 of the embodiment includes a power transmission section 100 inside the housing 2 as illustrated in FIG. 2 and the like. Here, the power transmission section 100 can switch between a power transmission state in which the power of the PF motor 6 is transmitted from the PF motor 6 to the medium receiving tray 5 and a power non-transmission state in which the power of the PF motor 6 is not transmitted from the PF motor 6 to the medium receiving tray 5.

The power transmission section 100 will be outlined below. As illustrated in FIGS. 7 to 12, the power transmission section 100 has a gear 101 that engages with the transport roller pulley 7*a*. The gear 101 is engaged with the gear 102, on the rotation shaft 102*a* of which are provided a lock component 103, which is a D-shaped gear, and a transmission component 104, which is a gear. The rotation shaft 102*a* of the gear 102, the lock component 103, and the transmission component 104 are along the X-axis direction. The lock component 103 and the transmission component 104 are configured to be integrally movable along the X-axis direction by the power switching mechanism 120 constituting the power transmission section 100.

Note that although the power switching mechanism 120 will be described in detail later, the lock component 103 is configured not to rotate by interfering with a holding section 123 constituting a part of the power switching mechanism 120, and the transmission component 104 is configured to rotate with the rotation of the gear 102.

As illustrated in FIGS. 7 to 12, the power transmission section 100 includes a gear 105. The power transmission section 100 enables the gear 105 and the lock component 103 to engage with each other and the gear 105 and the transmission component 104 to engage with each other by the power switching mechanism 120 moving the lock component 103 and the transmission component 104 along the X-axis direction.

When the gear 105 and the lock component 103 are engaged with each other, the power transmission section 100 is in the power non-transmission state. When the gear 105 and the transmission component 104 are engaged with each other, the power transmission section 100 is in a power transmission state.

Note that with the above configuration, when the gear 102 is rotating, the gear 105 does not rotate in a state where the gear 105 and the lock component 103 are engaged with each other, and the gear 105 rotates in a state where the gear 105 and the transmission component 104 are engaged with each other.

As illustrated in FIGS. 7 to 12, the gear 105 engages with the gear 106, the gear 106 engages with the gear 107, the gear 107 engages with the gear 108, and the gear 108 engages with the gear 109. The gear 109 engages with the gear 110. The gear 110 is engaged with a gear 111 having a common rotation shaft via a friction forming section 112. In other words, the gear 110, the gear 111, and the friction forming section 112 constitute a friction gear.

The friction forming section 112 is a known friction clutch, and transmits the rotation of the gear 110 to the gear 111 via a frictional force. By this, for example, even if the medium receiving tray 5 is stopped by receiving an external force and the gear 111 cannot be rotated thereby, the gear 110 can be rotated against the frictional force. Alternatively, even when the gear 111 is rotated by manually displacing the medium receiving tray 5, the gear 110 can maintain the stop of the rotation. With such a configuration, damage to the power transmission section 100 is suppressed.

The gear 111 is engaged with a gear 113 which is the final stage of the drive gear train of the power transmission section 100. The gear 113 is configured to be rotatable together with a pinion 114, which shares the same rotation shaft, and the medium receiving tray 5 is movable along the Y-axis direction in accordance with the rotation of the gear 113 by the pinion 114 engaging with a rack 5*a* formed in the medium receiving tray 5. As described above, the power transmission section 100 of the present embodiment includes the power switching mechanism 120 and the drive gear train from the gear 101 to the gear 113.

Here, in the recording device 1 of the present embodiment, as shown in FIG. 6, the power transmission section 100 located in the area L1 between the outer end of the transport roller pulley 7*a* and the outer end of the discharge roller pulley 8*a* in the Y-axis direction, which corresponds to the medium discharge direction. Here, when the power transmission section 100 is disposed on the distal end side in the discharge direction with respect to the discharge roller pulley 8*a*, the entire device is likely to protrude in the +Y direction, which is the distal end side in the discharge direction. When the power transmission section 100 is disposed in the −Y direction, which is to the rear end side in the discharge direction from the transport roller pulley 7*a*, the entire device is likely to protrude to the rear end side in the discharge direction. However, by disposing the power transmission section 100 in the area L1 as described above, the overall length of the recording device 1 in the discharge direction can be shortened. Therefore, the recording device 1 of the embodiment achieves reduction in the size of the recording device having the medium receiving tray 5, which is displaceable between the storage position and the protruding position.

Figure 4:
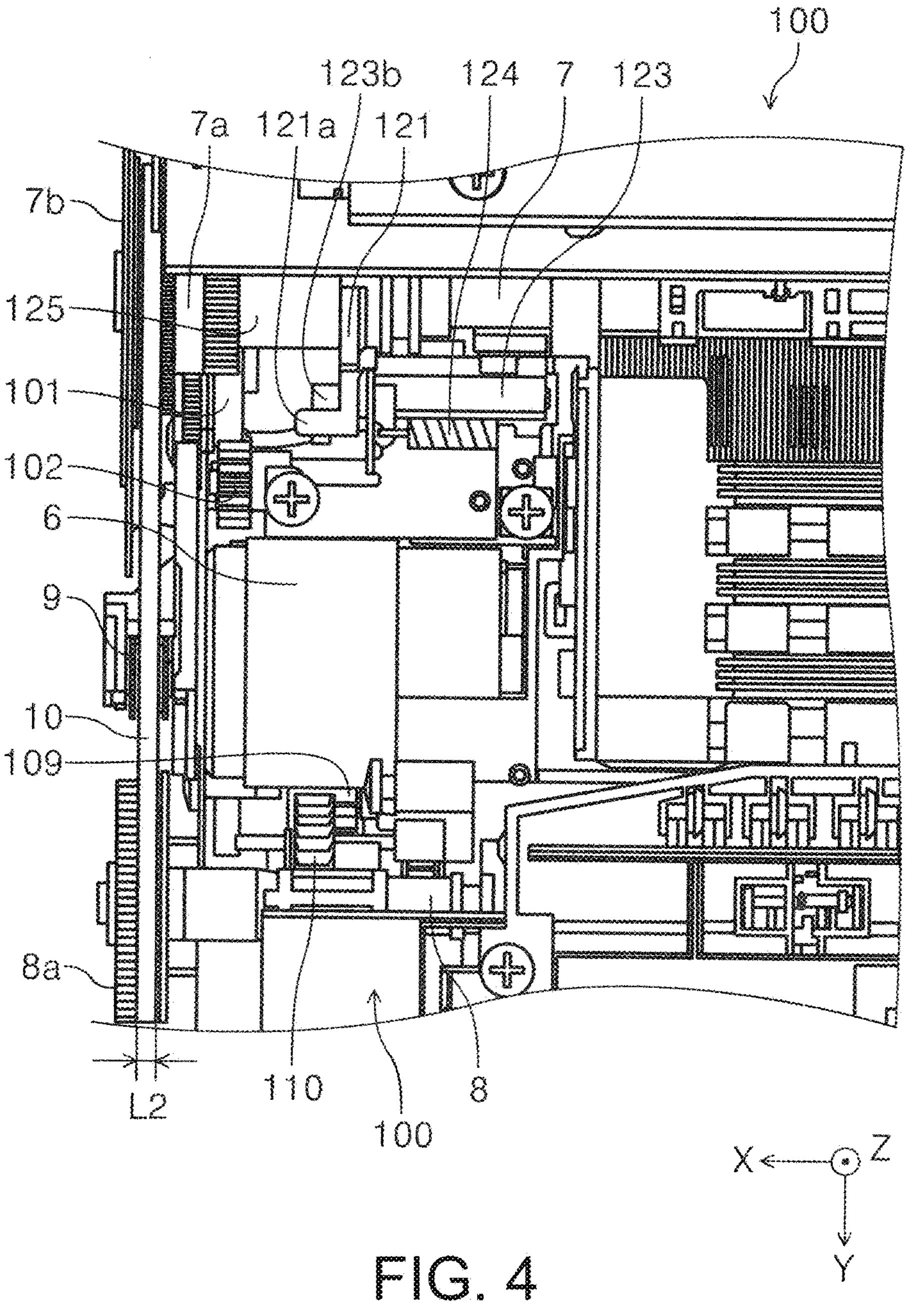
FIG. 4 is a plan sectional view showing the periphery of a power transmission section of the recording device in FIG. 1.
Figure 5:
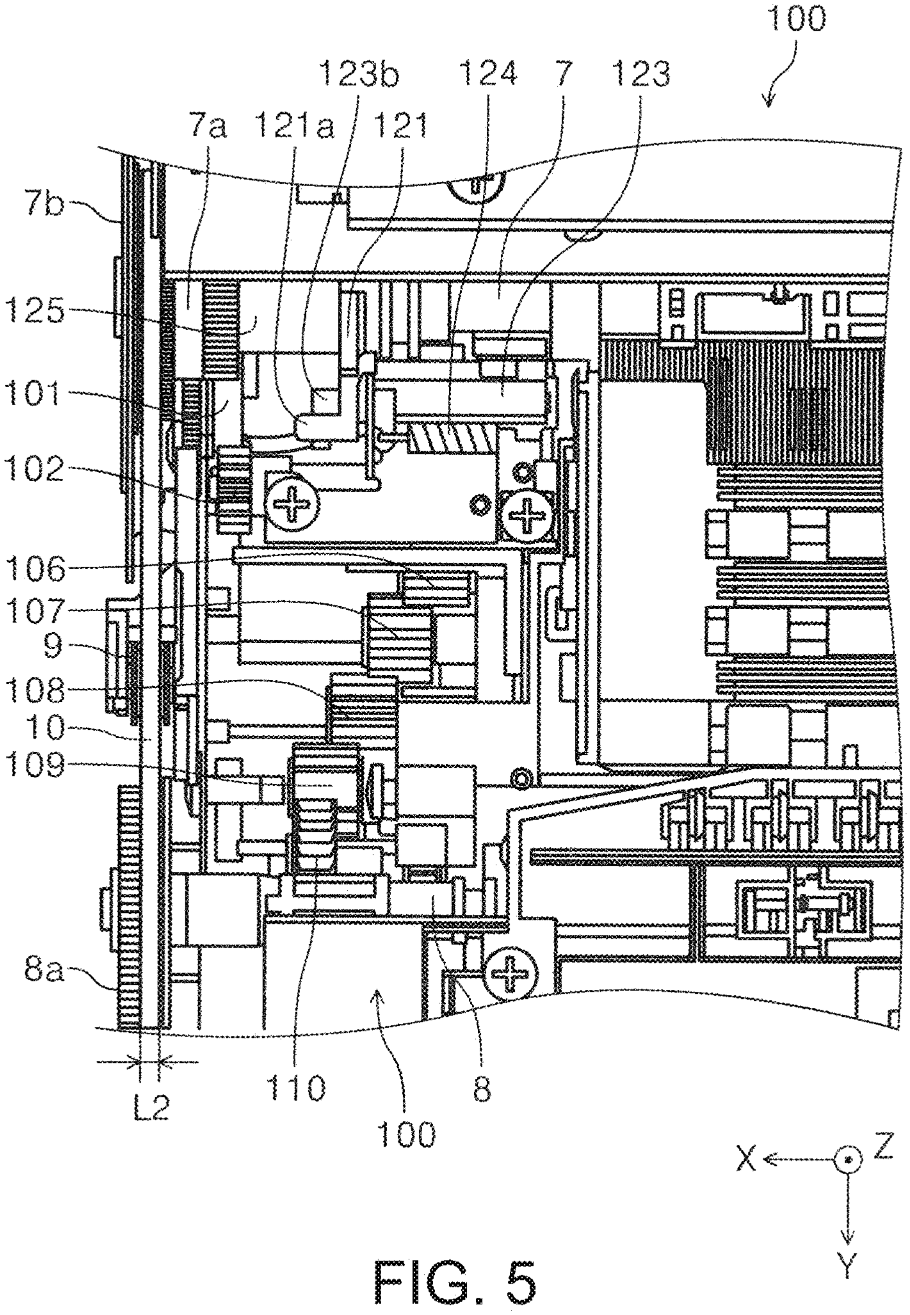
FIG. 5 is a plan sectional view showing the periphery of a power transmission section of the recording device of FIG. 1, and is a diagram showing the periphery of the power transmission section without showing a motor.

As illustrated in FIGS. 4 and 5, the power transmission section 100 of the embodiment is positioned on the inner side closer to the center of the recording device 1 than the routing range L2 of the belt 10, that is, further to the −X direction side in FIGS. 4 and 5 in the X axis direction, which corresponds to the reciprocating direction of the carriage 3, than the routing range L2 of the belt 10.

Here, if the power transmission section 100 is positioned outside the recording device 1 in the reciprocating direction of the carriage 3 with respect to the routing range of the belt 10, the entire device is likely to protrude in the reciprocating direction of the carriage 3. However, since the power transmission section 100 is positioned on the −X direction side of the area L2 as described above, the length of the entire recording device 1 in the reciprocating direction of the carriage 3 can be shortened. Therefore, the recording device 1 of the embodiment achieves a particularly reduced size of the recording device having the medium receiving tray 5, which can be displaced between the storage position and the protruding position.

As illustrated in FIG. 6, the power transmission section 100 of the embodiment is positioned around the PF motor 6 when viewed from the direction along the reciprocating direction of the carriage 3. In other words, the power transmission section 100 is disposed so as to go around the PF motor 6. Therefore, the recording device 1 of the embodiment suppresses the power transmission section 100 from interfering with the PF motor 6.

Figure 15:
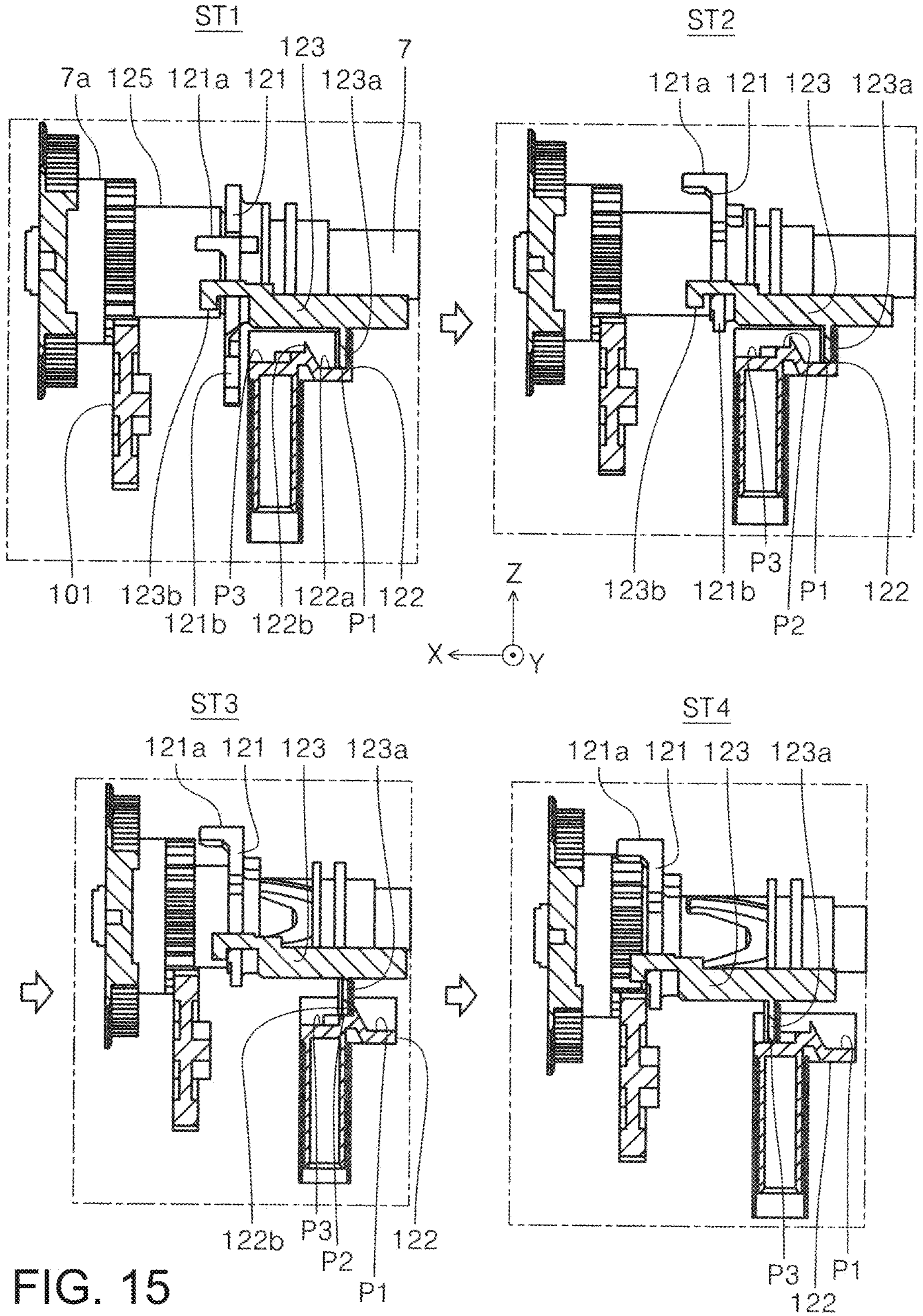
FIG. 15 is a front sectional view showing a state in which the switching lever section of the recording device in FIG. 1 is shifted from a state of being at a non-contact position to a state of being at a contact position, and the switching lever section is further slid.

Next, the recording device 1 of the embodiment will be described from the viewpoint of the arrangement of the power switching mechanism 120. As illustrated in FIGS. 8 to 12, the recording device 1 of the embodiment includes a switching lever section 121, a cam 122 (refer to FIGS. 3A and 3B), and a holding section 123 as the power switching mechanism 120. The switching lever section 121 switches the power transmission section 100 between the power transmission state and the power non-transmission state. The cam 122 has a cam surface 122*a* (see FIG. 3B). The holding section 123 holds the lock component 103 and the transmission component 104 as shown in FIGS. 11, 15, and the like, and has a pin 123*a* disposed on the cam surface 122*a* as shown FIG. 3B.

The cam 122 and the pin 123*a* constitute a cam mechanism 131 (see FIG. 3B) that holds the holding section 123 at a second position (to be described later). The pin 123*a* is an example of a cam contact section that moves while being in contact with the cam surface 122*a*.

As will be described in detail later, the power switching mechanism 120 can switch between the power non-transmission state and the power transmission state by movement of the switching lever section 121 in the X-axis direction and the accompany movement of the holding section 123 in the X-axis direction. As illustrated in FIG. 2, the power switching mechanism 120 is located in an area L3 between the outer end of the PF motor 6 and the outer end of the transport roller 7 in the Y-axis direction, which corresponds to the discharge direction of the medium.

Figure 3A:
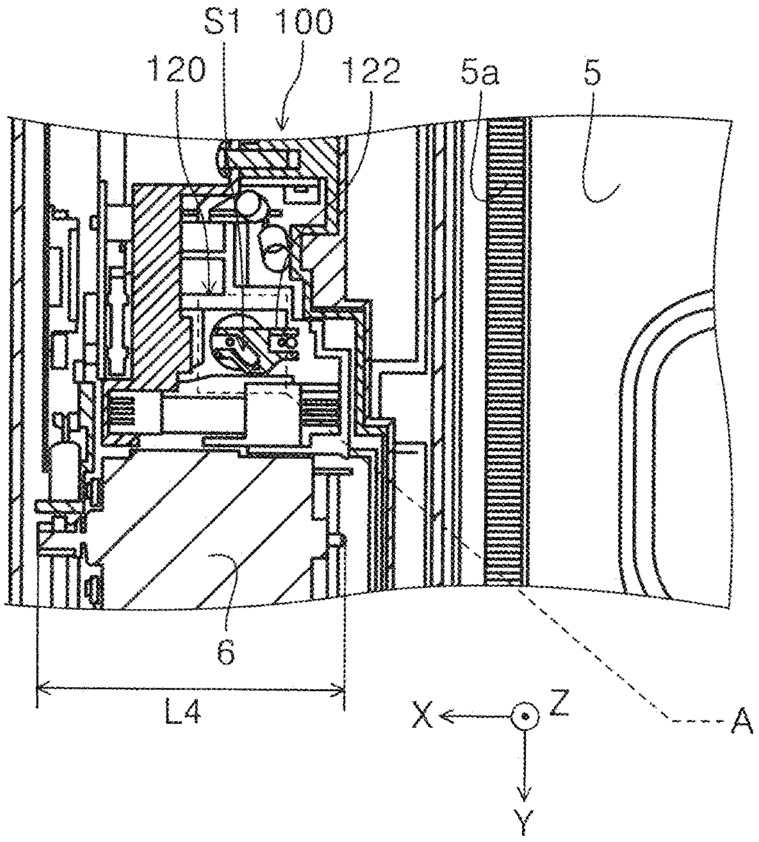
FIG. 3A is a plan sectional view showing internal configuration of the recording device in FIG. 1.

Note that the position S1 shown by FIG. 3A is a contact position between the cam surface 122*a* and the pin 123*a*.

Here, when the power switching mechanism 120 is disposed on the distal end side (+Y direction) in the discharge direction with respect to the outer end portion of the PF motor 6, the entire device is likely to protrude to the distal end side (+Y direction) in the discharge direction. When the power switching mechanism 120 is disposed on the rear end side (−Y direction) in the discharge direction with respect to the outer end portion of the transport roller 7, the entire device is likely to protrude to the rear end side (−Y direction) in the discharge direction. However, by disposing the power switching mechanism 120 in the area L3 as described above, the length of the entire recording device 1 in the discharge direction (Y-axis direction) can be shortened. Therefore, the recording device 1 of the embodiment achieves reduction in the size of the recording device having the medium receiving tray 5, which is displaceable between the storage position and the protruding position.

As shown in FIG. 3A, in the power switching mechanism 120 of the embodiment, the position S1 overlaps the occupied range L4 of the PF motor 6 in the reciprocating direction (X axis direction) of the carriage 3. Furthermore, as shown in FIG. 2, in the power switching mechanism 120 of the embodiment, the position S1 overlaps the occupied range L5 of the PF motor 6 in the Z axis direction, which corresponds to and intersecting direction that intersects both the discharge direction (Y axis direction) and the reciprocating direction (X axis direction) of the carriage.

As described above, it is desirable that the power switching mechanism 120 overlaps the PF motor 6 in at least one of the reciprocating direction (X axis direction) and the intersecting direction (Z axis direction) of the carriage 3. With such a configuration, the power switching mechanism 120 can be efficiently disposed with respect to the PF motor 6 in at least one of the reciprocating direction (X axis direction) of the carriage 3 and the intersecting direction (Z axis direction). As a result, it is possible to particularly reduce the size of the recording device including the medium receiving tray 5, which is displaceable between the storage position and the protruding position.

As shown in FIG. 2, in the power switching mechanism 120 of the present embodiment, the position S1 overlaps the occupied range L6 of the gear 113, which is the final stage of the drive gear train of the power transmission section 100, in the intersecting direction (Z-axis direction). With the power switching mechanism 120 of the present embodiment having such a configuration, the power switching mechanism 120 can be efficiently disposed with respect to the drive gear train of the power transmission section 100 in the intersecting direction (Z-axis direction). Therefore, the recording device 1 of the embodiment including the medium receiving tray 5, which is displaceable between the storage position and the protruding position, can be particularly reduced in size.

Figure 8:
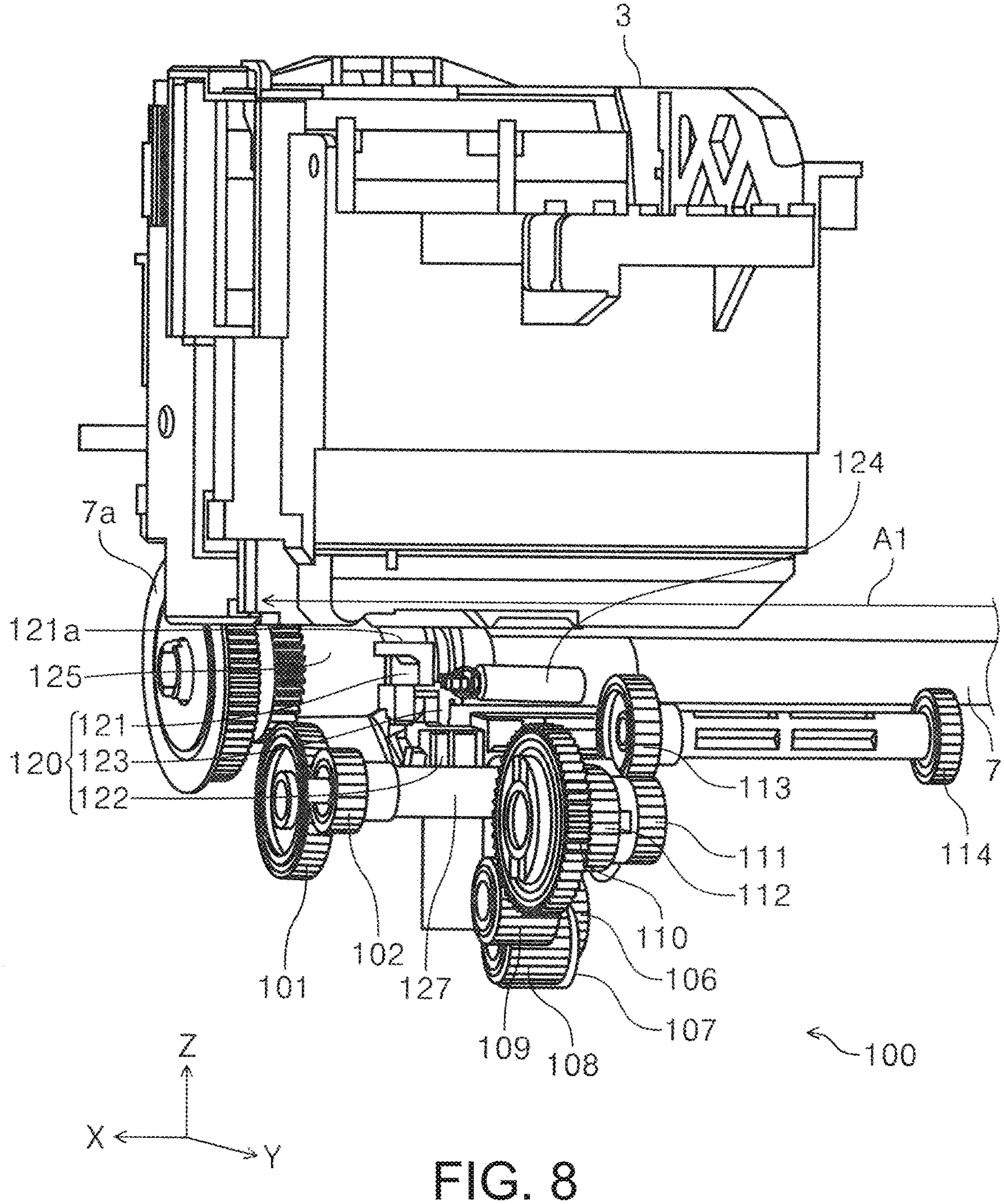
FIG. 8 is a perspective view showing a power transmission section and a carriage of the recording device of FIG. 1, and shows a state in which the carriage is on the power transmission section side within a reciprocating movement range and a switching lever section is at a non-contact position.

Hereinafter, the relationship between the operation of the power transmission section 100 will be described, particularly the switching lever section 121 of the power switching mechanism 120, the operation of the drive gear train of the power transmission section 100, and the operation of the carriage 3. As illustrated in FIGS. 8 and 9, the switching lever section 121 is provided within the reciprocating movement range A1 of the carriage 3 in the X axis direction. The reciprocating movement range A1 of the carriage 3 means an area where the carriage 3 exists during reciprocating movement of the carriage 3.

The switching lever section 121 can be displaced between a contact position and a non-contact position by rotating. As shown in FIG. 9 and by the state ST2 in FIG. 13, the contact position of the switching lever section 121 is a position where the tip section 121*a*, which is a part of the switching lever section 121, can contact the carriage 3 as the carriage 3 reciprocates. As shown in FIG. 8 and by the state ST1 in FIG. 13, the non-contact position of the switching lever section 121 is a position where no portion of the switching lever 121 contacts the carriage 3 even when the carriage 3 moves.

Figure 13:
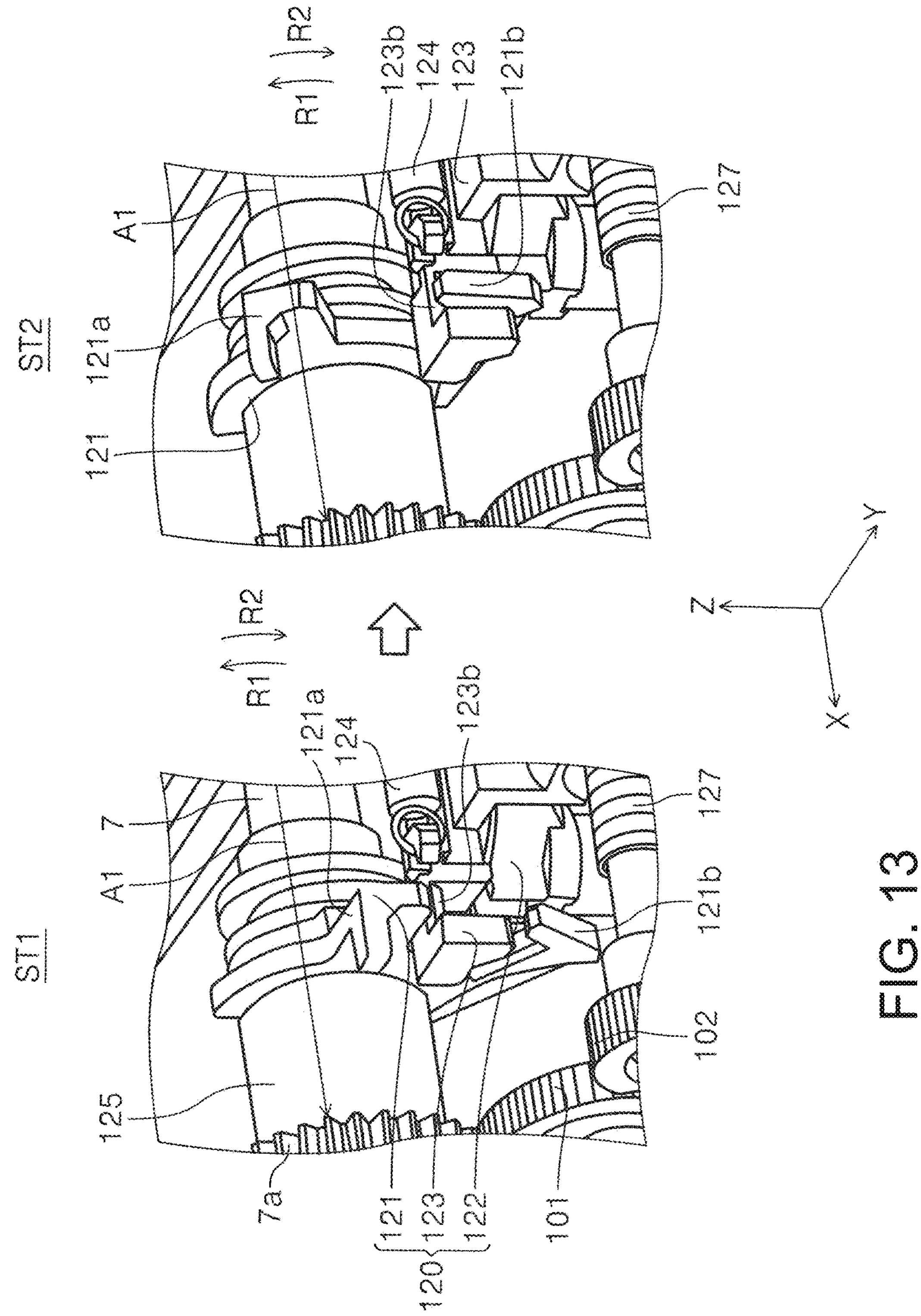
FIG. 13 is a perspective view showing a state in which the switching lever section of the recording device in FIG. 1 is shifted from a state of being at a non-contact position to a state of being at a contact position.

In detail, by rotating the PF motor 6 in the opposite direction to the rotation direction when the medium is transported, so that the transport roller 7 rotates in the rotation direction R1 in FIG. 13, the switching lever section 121 is shifted from the non-contact position of the state ST1 in FIG. 13, which is the initial state, to the contact position of the state ST2 in FIG. 13. Note that in the initial state, the switching lever section 121 is biased toward the rotation direction R2.

As shown in FIG. 13, the switching lever section 121 includes a tip section 121*a* that moves forward and backward within the reciprocating movement range A1 of the carriage 3 by rotating, and an engaging section 121*b* that when in the contact position engages with the engaged section 123*b* of the holding section 123, but does not engage with the engaged section 123*b* of the holding section 123 in the non-contact position.

Here, the switching lever section 121 is biased toward the −X direction side by an elastic member 125 (see FIGS. 10 and 11), and the holding section 123 is biased toward the −X direction side by a coil spring 124.

However, when the switching lever section 121 is at the contact position, as the carriage 3 moves in the +X direction, the switching lever section 121 comes into contact with the carriage 3 and slides in the +X direction, causing the holding section 123 to slide in the +X direction together with the switching lever section 121. The holding section 123 slides in the +X direction together with the switching lever section 121, whereby the power transmission section 100 is switched between the power non-transmission state and the power transmission state.

The holding section 123 is an example of a switching section that switches the power transmission section 100 from the power non-transmission state to the power transmission state by moving from the first position to the second position in the +X direction with respect to the first position in accordance with the movement of the carriage 3 in the +X direction. The states ST1 and ST2 in FIG. 15 show states in which the holding section 123 is located at the first position, and a state ST3 in FIG. 15 shows a state in which the holding section 123 is located at the second position.

Here, the cam surface 122*a* of the cam 122 will be described in detail.

Figure 3B:
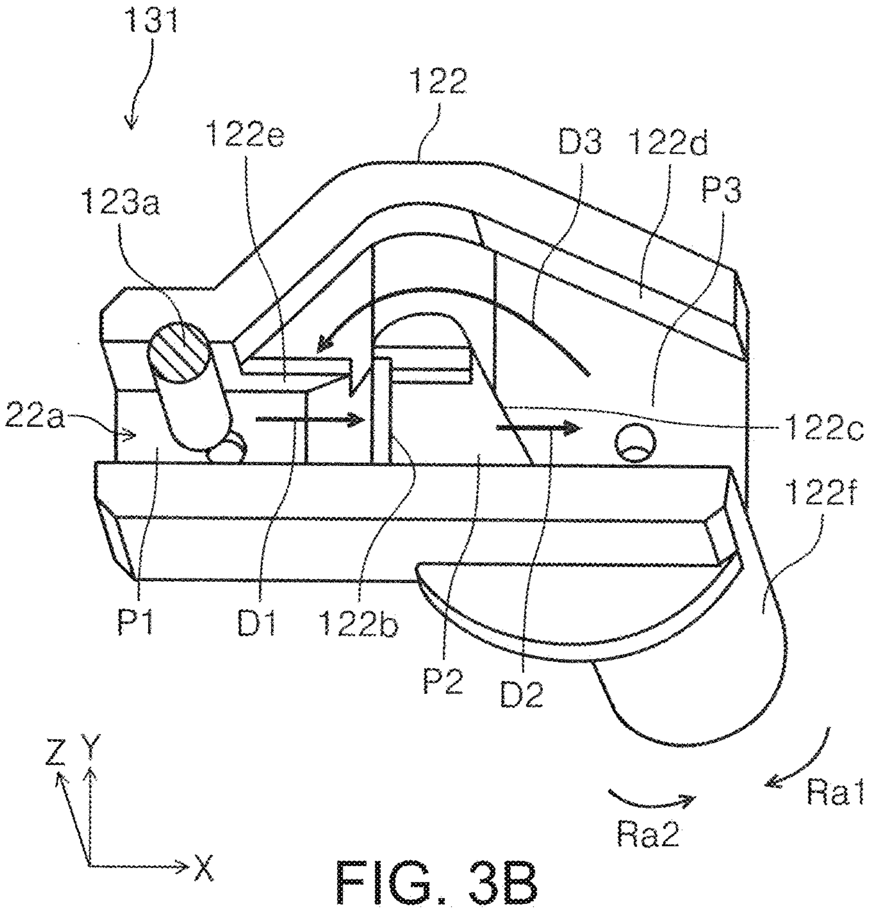
FIG. 3B is a perspective view of the cam shown in portion A of FIG. 3A.

As shown in FIG. 3B, the cam surface 122*a* has a first cam surface P1, a second cam surface P2, and a guide path P3. The pin 123*a* provided to the holding section 123 is disposed on the cam surface 122*a*.

Figure 3C:
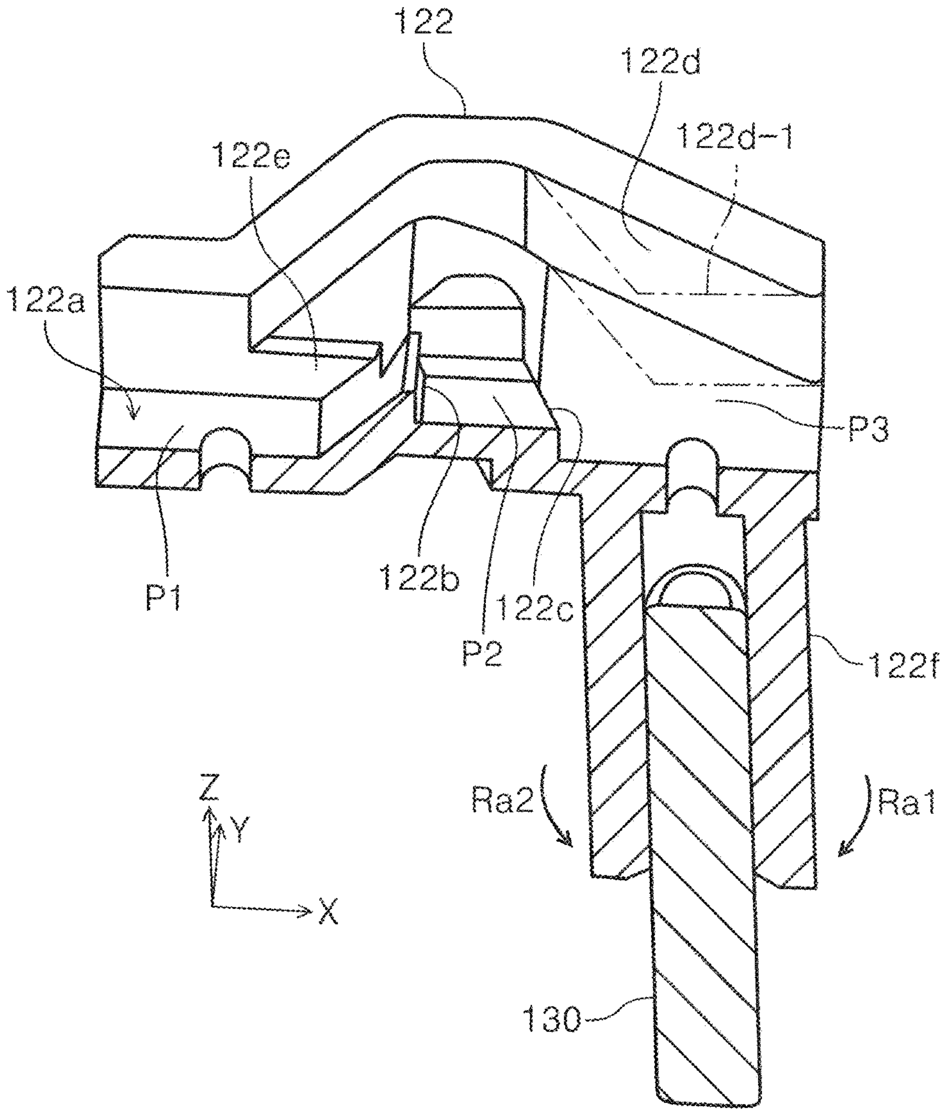
FIG. 3C is a cross-sectional perspective view of the cam shown in portion A of FIG. 3A.

The cam 122 has a cylinder section 122*f*, and a cam rotation shaft 130 is fitted to the cylinder section 122*f* as shown in FIG. 3C. By this, the cam 122 is rotatable about the cam rotation shaft 130 in a rotation direction Ra1 and a rotation direction Ra2.

The shaft center of the cam rotation shaft 130 is parallel to the Z-axis direction. The cam 122 is slidable in the Z-axis direction with respect to the cam rotation shaft 130. The cam 122 is pressed in the +Z direction by a pressing member (not shown), for example, a compression coil spring. By this, the cam surface 122*a* is pressed against the pin 123*a*. The pin 123*a* moves on the cam surface 122*a* in accordance with the movement of the holding section 123 along the X-axis direction in a state where the pin 122*a* is pressed against the cam surface LA. Reference numerals D1, D2, and D3 in FIG. 3B denote movement path when the pin 123*a* moves on the cam surface 122*a*.

When the power transmission section 100 is in the power non-transmission state, the pin 123*a* is located on the first cam surface P1. When the carriage 3 moves in the +X direction from this state and the switching lever section 121 and the holding section 123 move in the +X direction, the pin 123*a* moves from the first cam surface P1 to the second cam surface P2 as indicated by the movement path D1. When the pin 123*a* moves to the second cam surface P2, the power transmission section 100 is switched from the power non-transmission state to the power transmission state.

The second cam surface P2 is provided with a wall-shaped pin holding section 122*b*. The pin 123*a* moved to the second cam surface P2 is caught by the pin holding section 122*b*, and thus, even when the carriage 3 is retracted in the −X direction, the pin P2 is held on the second cam surface P2. Note that a pressing force by the coil spring 124 (see FIGS. 11 to 13) acts on the pin 123*a* in the −X direction, and thus the pin 123*a* tries to return from the second cam surface P2 to the first cam surface P1. However, when the pin 123*a* moves over the pin holding section 122*b* and moves completely to the second cam surface P2, the pin 123*a* is caught by the pin holding section 122*b* and held by the second cam surface P2.

When the state of the pin 123*a* being held on the second cam surface P2, that is, the power transmission state of the power transmission section 100, is to be switched to the power non-transmission state, the carriage 3 moves in the +X direction and the pin 123*a* moves from the second cam surface P2 to the guide path P3. The movement path D2 is a movement path of the pin 123*a* at this time.

Thereafter, the carriage 3 is retracted in the −X direction. Due to a step section 122*c*, the guide path P3 is one step lower in the −Z direction than the second cam surface P2, and the pin 123*a* that entered the guide path P3 cannot return to the second cam surface P2. The guide path P3 guides the pin 123*a* to the first cam surface P1. The pin 123*a* that has entered the guide path P3 moves along the guide path P3 toward the first cam surface P1 by the pressing force of the coil spring 124 (see FIGS. 11 to 13), and returns to the first cam surface P1. The movement path D3 is a movement path of the pin 123*a* at this time.

Since the guide path P3 is formed in a curved shape so as to reach the first cam surface P1 by bypassing the second cam surface P2, when the pin 123*a* moves on the guide path P3 toward the first cam surface P1, the cam 122 rotates about the cam rotation shaft 130. To be specific, the pin 123*a* that has entered the guide path P3 from the second cam surface P2 abuts against the step section 122*c* by the pressing force of the coil spring 124 (see FIGS. 11 to 13). By this, the cam 122 rotates in the rotation direction Ra2. When the pin 123*a* returns from the guide path P3 to the first cam surface P1, the cam 122 rotates in the rotation direction Ra1.

Note that due to a step section 122*e*, the first cam surface P1 is one step lower in the −Z direction from the guide path P3 and the pin 123*a* does not enter the guide path P3 from the first cam surface P1.

Note that the outer wall section 122*d* of the guide path P3 is formed to widen the path so that the pin 123*a* does not, to the greatest extend possible, contact the outer wall section when the pin 123*a* moves from the second cam surface P2 to the guide path P3. In FIG. 3C, reference numeral 122*d*-1 denotes an outer wall section shown as a comparative example. The guide path P3 formed by the outer wall section 122*d*-1 is narrower than the guide path P3 formed by the outer wall portion 122*d*. When the pin 123*a* enters the guide path P3 formed by the outer wall section 122*d*-1, the pin 123*a* that is going to return to the first cam surface P1 is pressed against the outer wall section 122*d*-1. In this case, when the pin 123*a* is pressed against the outer wall portion 122*d*-1 in the +X direction from the shaft center of the cam rotation shaft 130, the cam 122 cannot rotate while the pin 123*a* is in contact with the outer wall section 122*d*-1, and there is a concern that the cam 122 may lock. However, the outer wall section 122*d* of the guide path P3 is formed to widen the path width so as to not, to the extent possible, contact with pin 123*a* when the pin 123*a* returns to the first cam surface P1, and thus the occurrence of lock as described above can be suppressed.

Note that when the pin 123*a* moves from the second cam surface P2 to the guide path P3 and the pin 123*a* returns to the first cam surface P1 through the guide path P3, the power transmission section 100 is switched from the power transmission state to the power non-transmission state.

Figure 14:
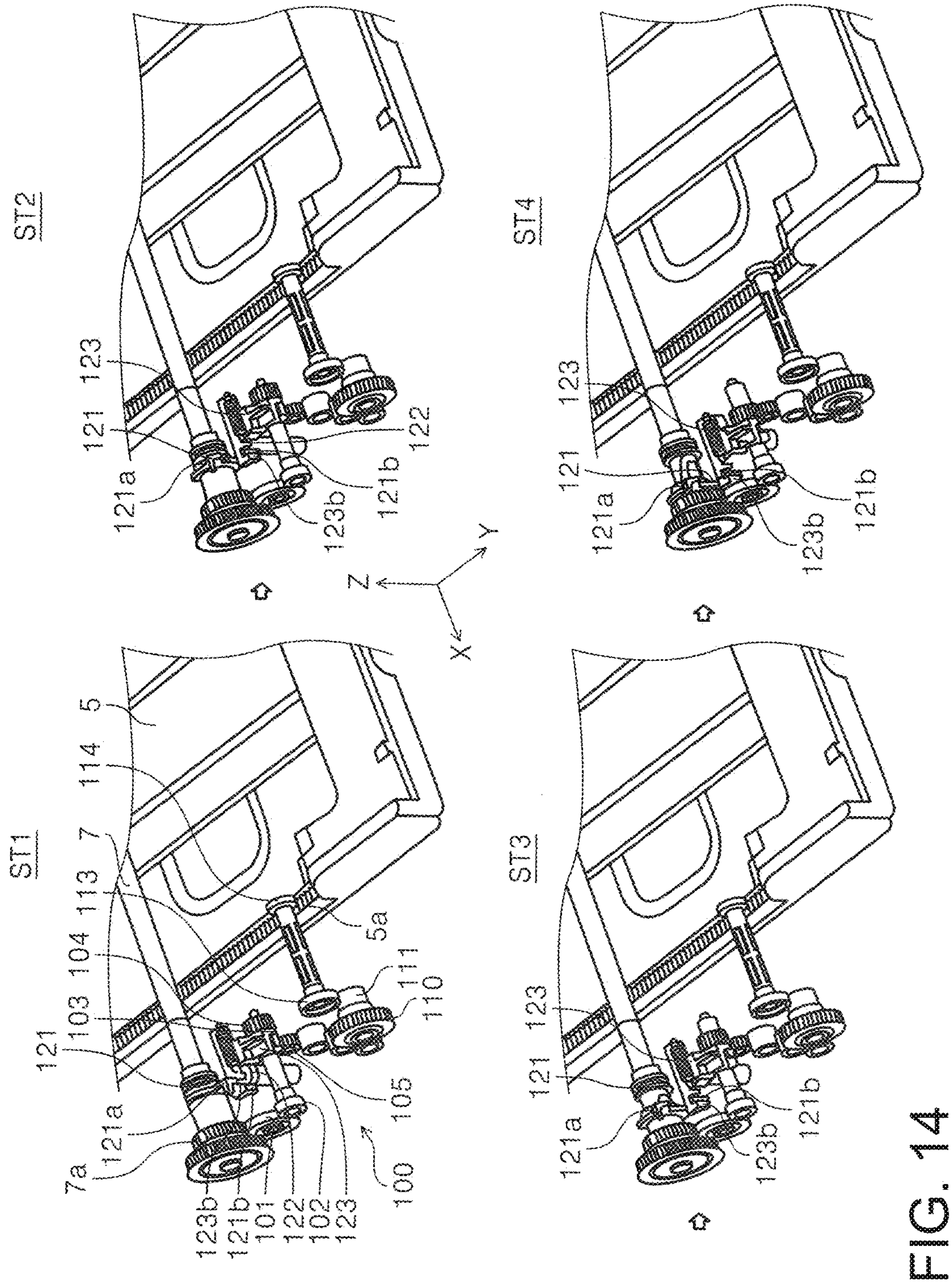
FIG. 14 is a perspective view showing a state in which the switching lever section of the recording device in FIG. 1 is shifted from a state of being at a non-contact position to a state of being at a contact position, and the switching lever section is further slid.
Figure 16:
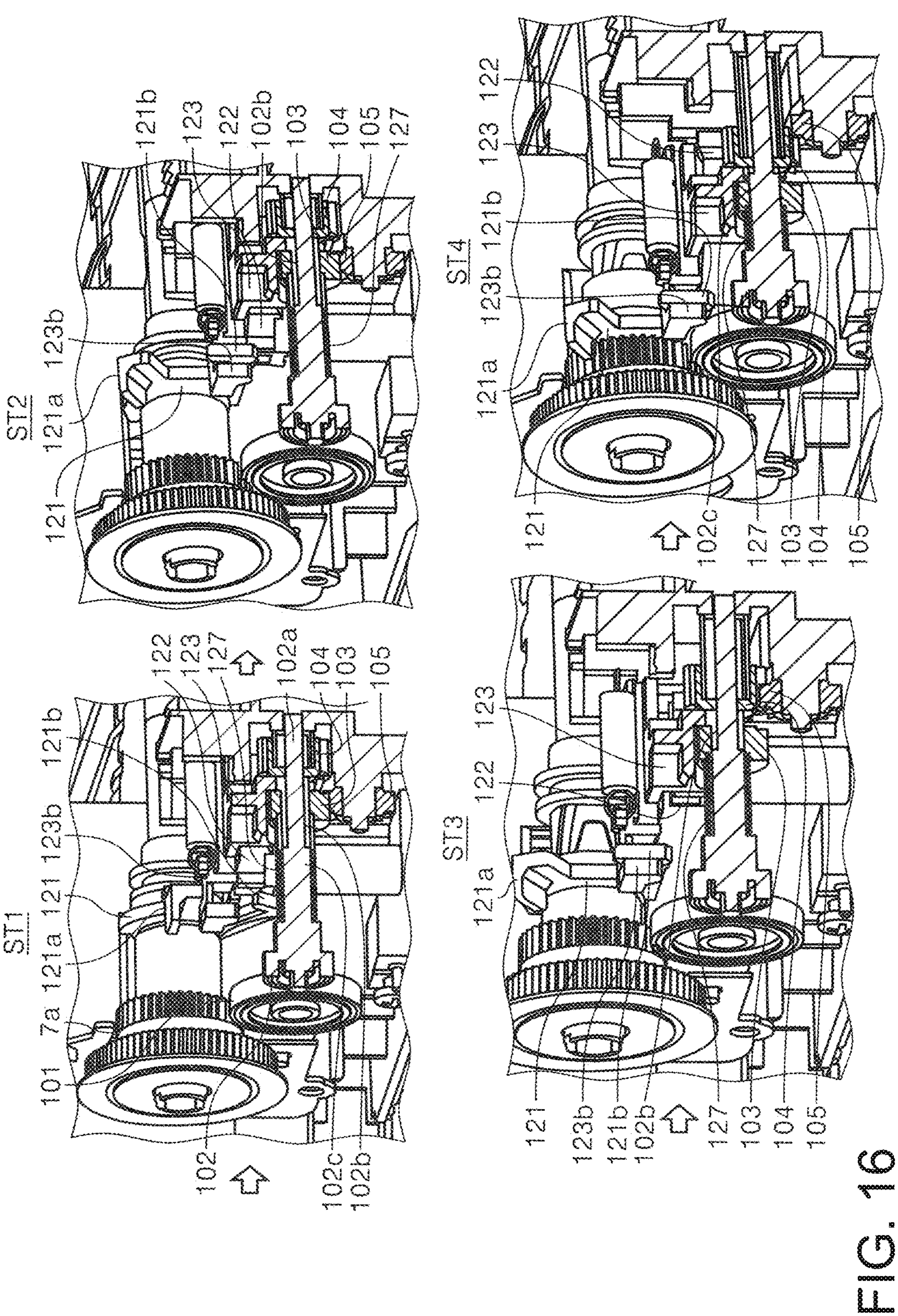
FIG. 16 is a perspective cross-sectional view showing a state in which the switching lever section of the recording device in FIG. 1 is shifted from a state of being at a non-contact position to a state of being at a contact position, and the switching lever section is further slid.

Hereinafter, switching of the power transmission section 100 from the power non-transmission state to the power transmission state and switching of the power transmission section 100 from the power transmission state to the power non-transmission state will be further described with reference to FIGS. 3B, 14, 15, 16, and 20. FIGS. 14, 15, and 16 all show a state in which the power transmission section 100 is switched from the power non-transmission state to the power transmission state. Note that in FIGS. 14 to 16, the carriage 3 is not shown. Note that the control described below is executed by a control section 200 (see FIG. 21) which will be described later.

The state ST1 in FIGS. 14, 15, and 16 corresponds to the state ST1 in FIG. 13, and represents a state in which the switching lever section 121 is in the non-contact position, which is the initial state. Note that in this state, the pin 123*a* of the holding section 123 is located at the first cam surface P1 in FIG. 3B.

When the PF motor 6 is rotated in the reverse direction from this state, the state ST1 of FIGS. 14, 15, and 16 is shifted to the state ST2 of FIGS. 14, 15, and 16. This corresponds to the switching lever section 121 rotating and transitioning from the state ST1 in FIG. 13 to the state ST2 in FIG. 13. In detail, the switching lever section 121 rotates in the rotation direction R1, the tip section 121*a* enters the reciprocating movement range A1 of the carriage 3, and the engaging section 121*b* engages with the engaged section 123*b*. Note that in this state, the pin 123*a* of the holding section 123 is also located at the first cam surface P1 in FIG. 3B.

Here, in the state ST1 and the state ST2 of FIGS. 14, 15, and 16, the gear 105 and the lock component 103 are engaged with each other, and the power transmission section 100 is in the power non-transmission state.

Next, from the state ST2 in FIGS. 14, 15, and 16, the tip section 121*a* comes into contact with the carriage 3, the switching lever section 121 is pushed in the +X direction, and the state shifts to the state ST3 in FIGS. 14, 15, and 16.

Note that in this state ST3, the pin 123*a* of the holding section 123 is moved to the second cam surface P2 in FIG. 3B.

Figure 20:
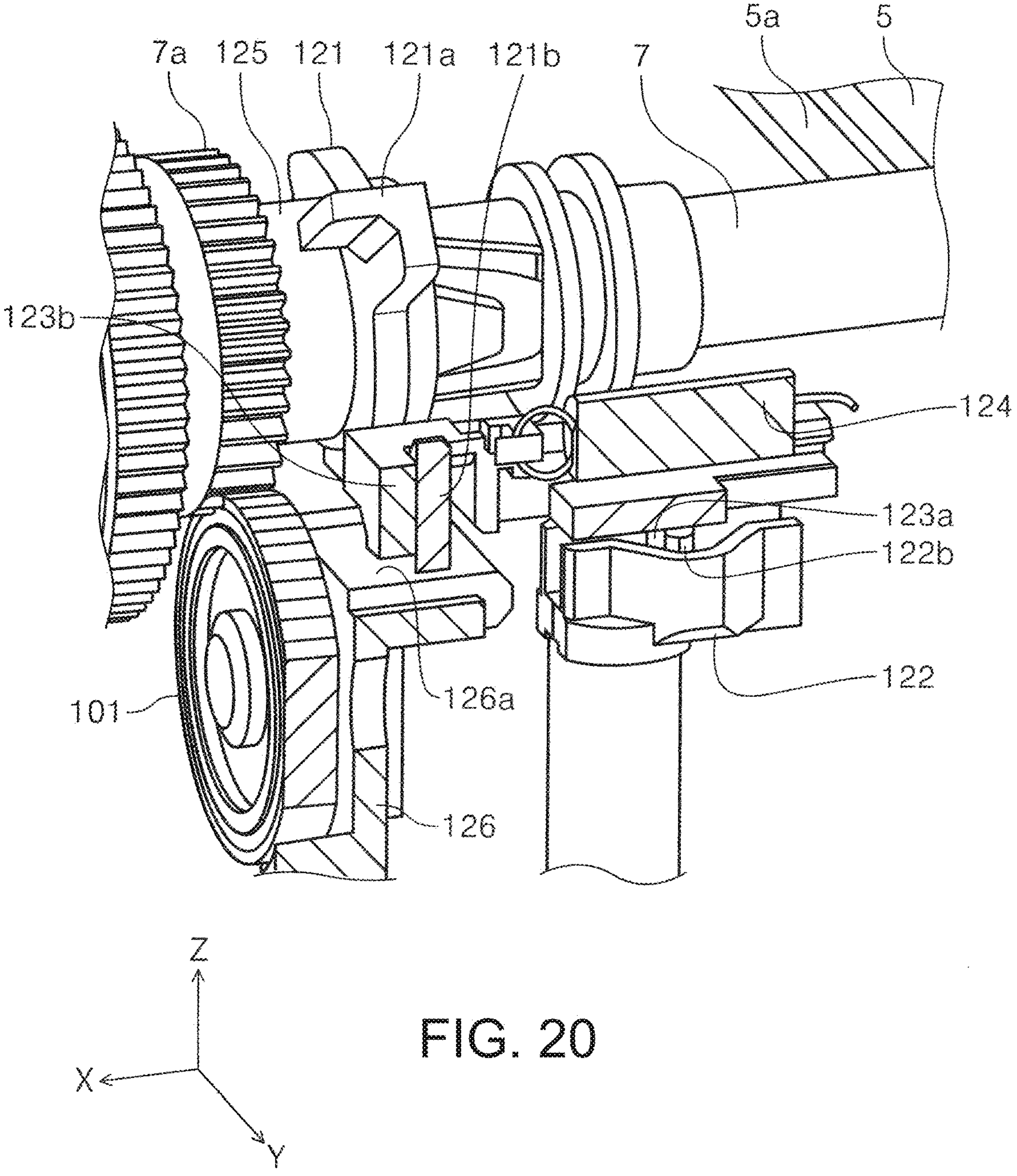
FIG. 20 is a perspective sectional view of the power transmission section of the recording device in FIG. 1, and is a diagram showing a state in which a switching lever section is at a contact position.

In the state ST3 of FIGS. 14, 15, and 16, the gear 105 and the transmission component 104 are engaged with each other, and the power transmission section 100 in the power transmission state. In the state ST3 in FIGS. 14, 15, and 16, the engaging section 121*b* and the engaged section 123*b* are supported by the upper surface 126*a* of the support frame 126 that supports the gear 101 as shown in FIG. 20. Therefore, disengagement of the engaging section 121*b* and the engaged section 123*b* is suppressed.

Next, from the state ST3 in FIGS. 14, 15, and 16, the tip section 121*a* comes into contact with the carriage 3, the switching lever section 121 is further pushed in the +X direction, and the state shifts to the state ST4 in FIGS. 14, 15, and 16.

Note that in this state, the pin 123*a* of the holding section 123 is positioned at the guide path P3 in FIG. 3B. Then, as the carriage 3 moves in the −X direction, the pin 123*a* returns to the first cam surface P1 by the biasing force of the elastic member 125 and the coil spring 124 acting in the −X direction.

With such a configuration, the recording device 1 of the example can suitably dispose the power switching mechanism 120 and the switching lever section 121 for switching the power transmission section 100 between the power non-transmission state and the power transmission state, and can reduce the size of the entire mechanism for switching the medium receiving tray 5 between the storage position and the protruding position. This also enables reduction in the size of the entire recording device 1.

As described above, in the switching lever section 121 of the recording device 1 of the embodiment, at least the tip section 121*a* enters the reciprocating movement range A1 of the carriage 3 at the contact position as represented by the state ST2 in FIGS. 9 and 13, and the tip section 121*a* retreats from the reciprocating movement range A1 of the carriage 3 at the non-contact position as represented by the state ST1 in FIGS. 8 and 13. In this manner, by the tip section 121*a* being retracted from the reciprocating movement range A1 of the carriage 3 at the non-contact position in the power non-transmission state, it is possible to eliminate the need to provide the switching lever section 121 outside the reciprocating movement range A1 of the carriage 3, and it is possible to particularly reduce the size of the recording device 1.

As described above, in the recording device 1 of the embodiment, the power transmission section 100 includes the lock component 103 that prevents the rotation of the gears when the power transmission section 100 is in the power non-transmission state as represented by the state ST2 of FIGS. 14 and 16, and the transmission component 104 that transmits the power of the PF motor 6 when the power transmission section 100 is in the power transmission state as represented by the state ST3 of FIGS. 14 and 16.

As is clear from a comparison between the state ST2 in FIG. 16 and the state ST3 in FIG. 16, by sliding in the +X direction in contact with the carriage 3, the switching lever section 121 switches connection with respect to the gear 105 of the lock component 103 and the transmission component 104 in the power transmission section 100.

By adopting such a configuration, the recording device 1 of the embodiment can easily form a mechanism that prevents the rotation of the gear in the power non-transmission state and a mechanism that transmits the power of the PF motor 6 in the power transmission state.

In the recording device 1 of the example, when the medium receiving tray 5 is manually operated, a load is generated by the friction forming section 112 (refer to FIGS. 11 and 12). The purpose of generating this load is to prevent the medium receiving tray 5 from moving due to its own weight when the device is inclined while the recording device 1 is stored or the like, or to create an operational feeling of manual operation. Note that when power is transmitted, the connection between the lock component 103 and the transmission component 104 is switched, the lock of the gear train is released, and the medium receiving tray 5 is driven by the motor power.

Here, the power transmission section 100 is configured such that the connection of the gear 105 can be switched from the lock component 103 to the transmission component 104 by applying an external load by contact from the carriage 3 in the +X direction, which is the direction in which the switching lever section 121 slides due to contact by the carriage 3, or by manually applying an external load, for example, by the user. The recording device 1 of the embodiment is configured as described above, and thus, for example, when the power of the recording device 1 is turned off, the user can manually switch between the power transmission state and the power non-transmission state. Further, the number of parts of the mechanism that enables the user to manually switch between the power transmission state and the power non-transmission state can be reduced.

Figure 17:
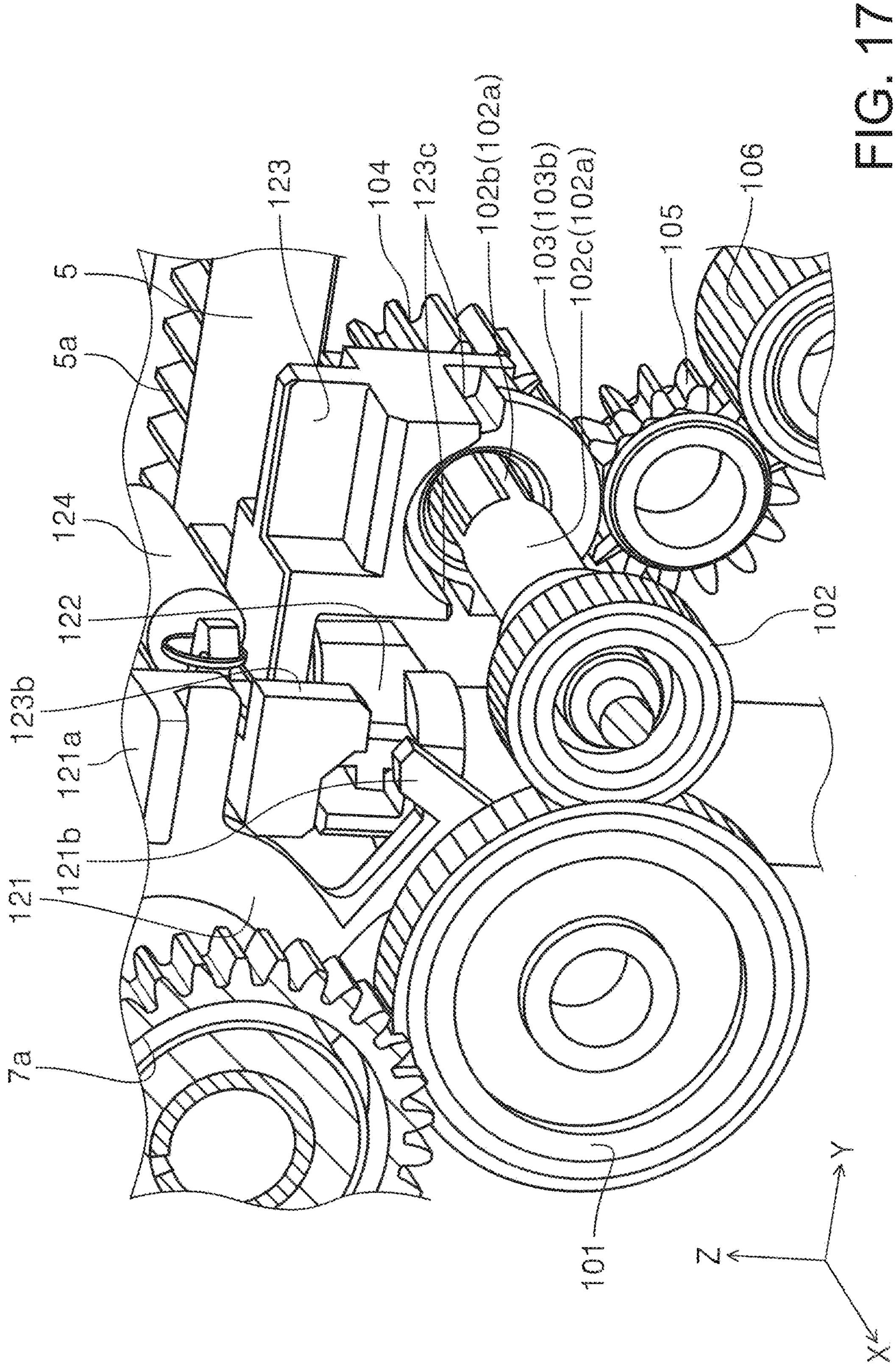
FIG. 17 is a perspective view showing a periphery of a lock component and a transmission component of a power transmission section of the recording device in FIG. 1.
Figure 18:
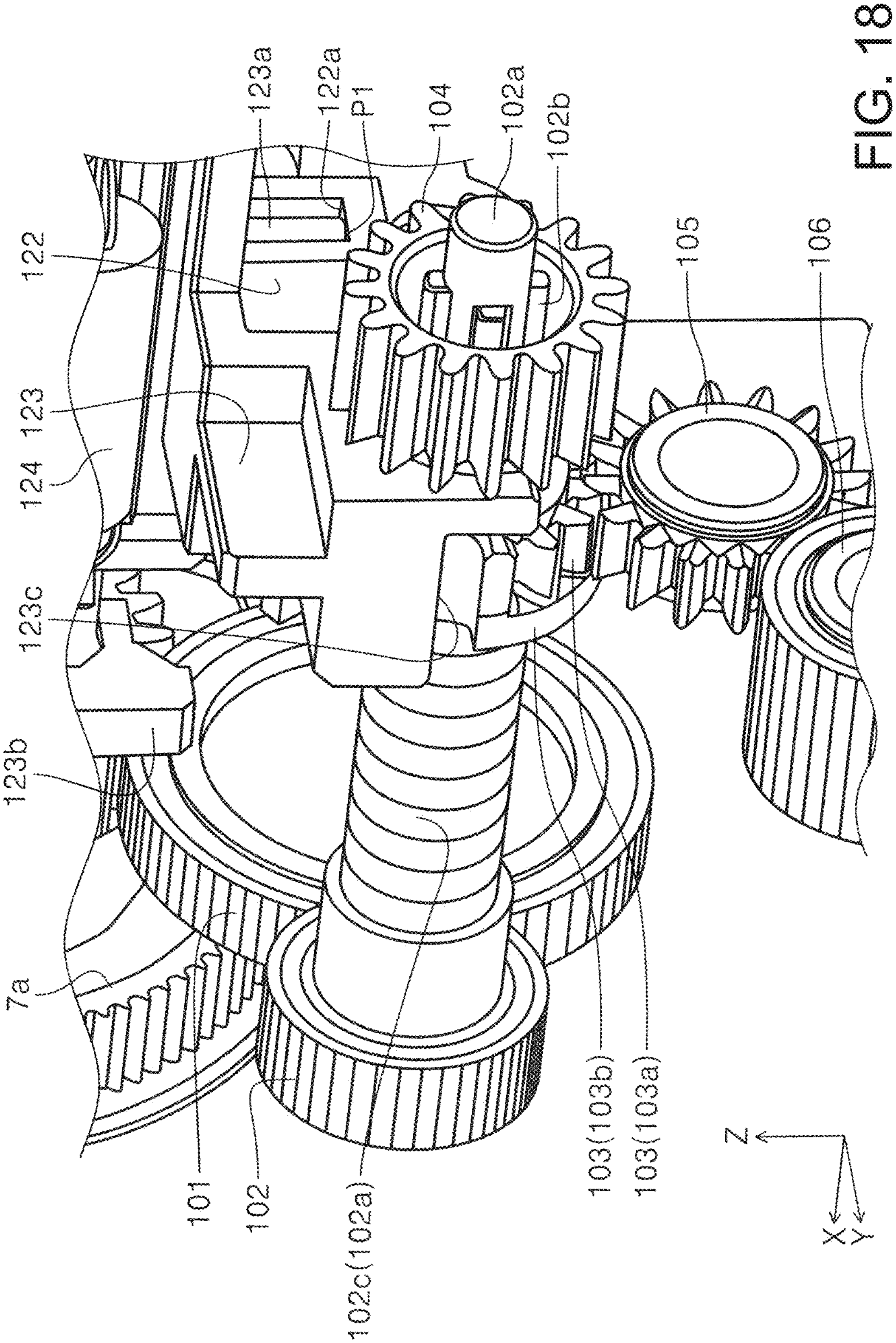
FIG. 18 is a perspective view of the periphery of the lock component and the transmission component of the power transmission section of the recording device in FIG. 1 as viewed from an angle different from that in FIG. 17.
Figure 19:
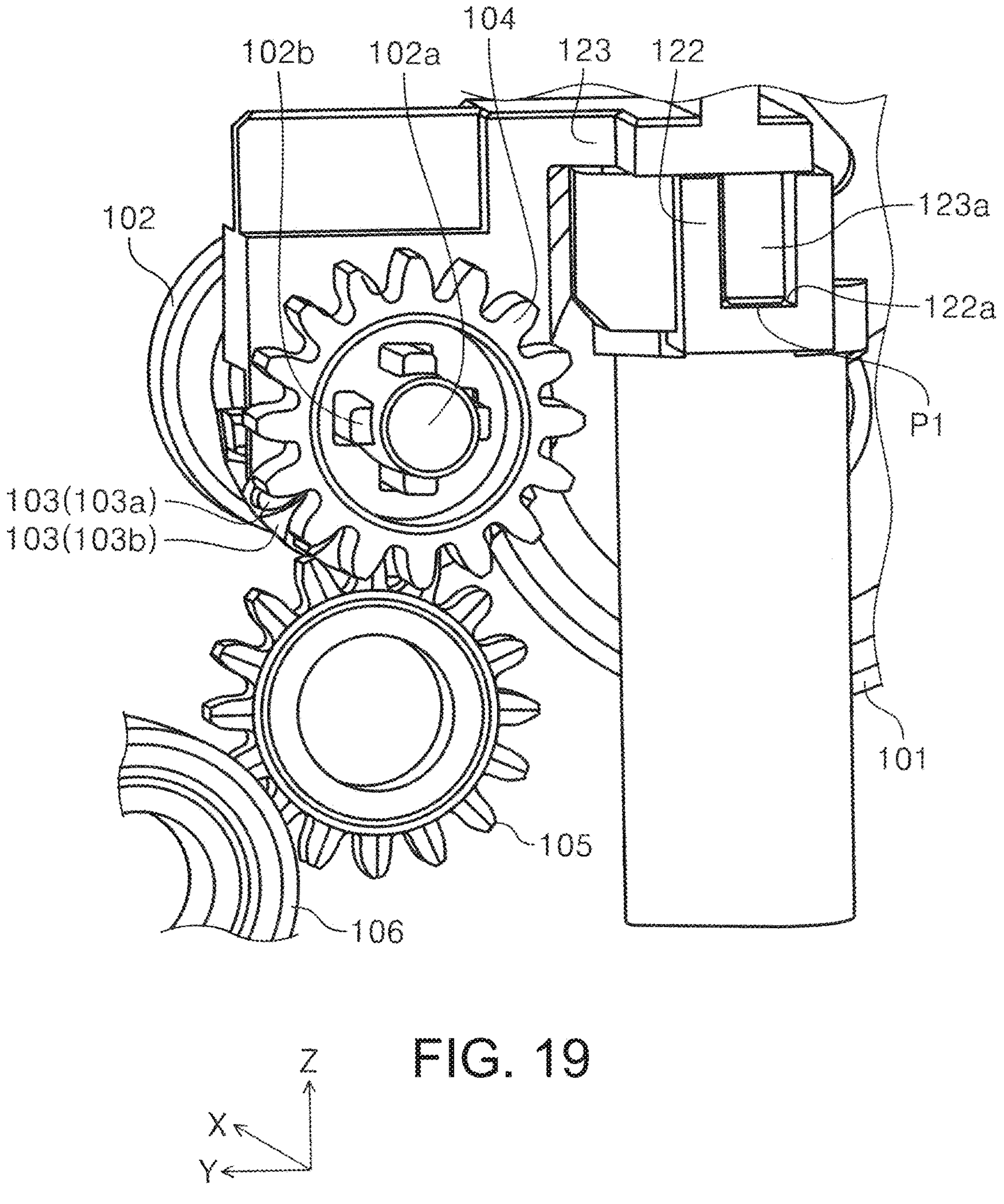
FIG. 19 is a perspective view of the periphery of the lock component and the transmission component of the power transmission section of the recording device in FIG. 1 as viewed from an angle different from those in FIGS. 17 and 18.

Here, a configuration of a mechanism for switching the connection of the lock component 103 to the transmission component 104 with respect to the gear 105 in the power transmission section 100 will be described with reference to FIGS. 16 to 19. Here, FIGS. 17, 18, and 19 show the state ST1 in FIG. 16, that is, a state in which the pin 123*a* on the cam surface 122*a* of the cam 122 is on the first cam surface P1 in FIG. 3B. In FIG. 17, a compression spring 127 (to be described later) is omitted for easy understanding of the shape of the rotation shaft 102*a* of the gear 102.

As shown in FIGS. 18 and 19, an area on the −X direction side of the center of a rotation shaft 102*a* of the gear 102 forms a cross shape 102*b*. As illustrated in FIG. 19, the transmission component 104 is provided with a cross-shaped hole section, and is configured to be fitted to the cross shape 102*b* of the rotation shaft 102*a* so that the transmission component 104 also always rotates with rotation of the rotation shaft 102*a*.

On the other hand, as shown in FIGS. 16 and 17, the lock component 103 is provided with a round hole through which the rotation shaft 102*a* passes. The round hole of the lock component 103 faces the cross shape 102*b* area of the rotation shaft 102*a* in state ST1, state ST2, and state ST3 of FIG. 16. In the state ST4 in FIG. 16, the round hole of the lock component 103 faces the cylindrical area 102*c* of the rotation shaft 102*a* that is not the area of the cross shape 102*b*. The lock component 103 is configured so as not to rotate together with the rotation shaft 102*a* in all of the state ST1, the state ST2, the state ST3, and the state ST4 in FIG. 16, even when the rotation shaft 102*a* rotates.

Note that as shown in FIG. 17, the lock component 103 has a configuration in which a flange section 103*b* (to be described later) has a substantially D shape, and even when the rotation shaft 102*a* is rotated and the lock component 103 attempts to rotate with it, the abutted section 123*c* of the holding section 123 abuts against the flange section 103*b*, so that the lock component 103 does not rotate with the rotation of the rotation shaft 102*a*.

Note that as shown in FIG. 18 and the like, a compression spring 127 is provided between the gear 102 of the rotation shaft 102*a* and the lock component 103, and the lock component 103 is biased by the compression spring 127 toward the −X direction side, which is a direction away from the gear 102. The lock component 103 has a tooth section 103*a* on the −X direction side and a substantially D-shaped flange section 103*b* on the +X direction side. Since the compression spring 127 is provided and the lock component 103 has such a configuration, the teeth of the lock component 103 and the gear 105 easily engage with each other even if the teeth come into temporary contact with each other, and the lock component is suitably positioned. Further, by providing such a compression spring 127, when the state ST2 in FIG. 16 is shifted to the state ST3 in FIG. 16, even if the teeth of the transmission component 104 temporarily contact against the teeth of the gear 105, the teeth of both components can easily engage with each other.

Next, a control system of the recording device 1 will be described with reference to FIG. 21.

The control section 200 performs various types of control including recording control in the recording device 1. The rotation of the transport roller 7 and the operation of the carriage 3 described above are controlled by the control section 200. Note that in FIG. 21, only the components necessary for the description in the present specification are shown, and the other components are not shown.

The PF motor 6 and the carriage motor 207 are electrically connected to the control section 200 as an output system. Note that the carriage motor 207 is abbreviated as a CR motor 207. The CR motor 207 is a power source of the carriage 3. The carriage 3 is fixed to a part of an endless belt (not shown) wound along the X-axis direction, and the CR motor 207 drives the endless belt, whereby the carriage 3 moves in the X-axis direction.

Each of the motors is, for example, a DC motor.

The rotary encoder 211, the linear encoder 212, and the tray detection section 213 are electrically connected to the control section 200 as an input system.

The rotary encoder 211 includes the encoder scale 7*b* (refer to FIG. 7) described above and a detection section (not illustrated) that detects rotation of the encoder scale 7*b*. The control section 200 can detect the driving direction, the driving amount, and the driving speed of the PF motor 6 and the driving target driven by the PF motor 6 based on the detection information of the rotary encoder 211.

The linear encoder 212 includes a linear encoder scale (not shown) that is disposed along the movement area of the carriage 3 and extends in the X axis direction, and a detection section (not shown) that is provided integrally with the carriage 3 and detects the linear encoder scale. The control section 200 can detect the driving direction, the driving amount, and the driving speed of the carriage 3 driven by the CR motor 207 based on the detection information of the linear encoder 212.

The tray detection section 213 is a detection means for grasping the current position of the medium receiving tray 5. In the present embodiment, the tray detection section 213 is provided so that a signal change occurs when the medium receiving tray 5 at the storage position moves toward the protruding position. However, the tray detection section 213 may be provided at both the storage position and the protruding position of the medium receiving tray 5, and may be configured to be able to detect that the medium receiving tray 5 is at the storage position and to be able to detect that the medium receiving tray 5 is at the protruding position.

The tray detection section 213 may be a contact type sensor that comes into contact with the medium receiving tray 5 or may be a non-contact type sensor.

Note that when the power transmission section 100 is in the power transmission state, the medium receiving tray 5 can be displaced, and when the power transmission section 100 is in the power non-transmission state, the medium receiving tray 5 cannot be displaced. Therefore, the tray detection section 213 can also serve as a means that detects whether the power transmission section 100 is in the power transmission state or the power non-transmission state.

The control section 200 is connected to an operation panel 210 (see also FIG. 1). The operation panel 210 constitutes a part of the exterior of the recording device 1. The operation panel 210 includes a plurality of buttons and a display screen. The display screen can display various types of information of the recording device 1. The control section 200 controls display of the operation panel 210 and receives information transmitted from the operation panel 210.

The control section 200 includes a computer program, in other words, a CPU 201 that executes software, a volatile memory 202, and a non-volatile memory 203. Therefore, the control section 200 can also be referred to as a computer.

The CPU 201 performs various calculations necessary for executing the program 204 stored in the non-volatile memory 203.

The volatile memory 202 is used as a temporary data storage area. The non-volatile memory 203 stores the program 204 and control parameters 205 necessary for executing the program 204. The program 204 includes a program for executing various controls described in the present specification, and the control parameters 205 include a parameter for executing the program 204. Various types of control described in the present specification are realized by the control section 200 executing the program 204.

Next, a relationship between the position and the movement amount of the carriage 3 and the position of the pin 123*a* with respect to the cam 122 will be described with reference to FIG. 23.

Figure 23:
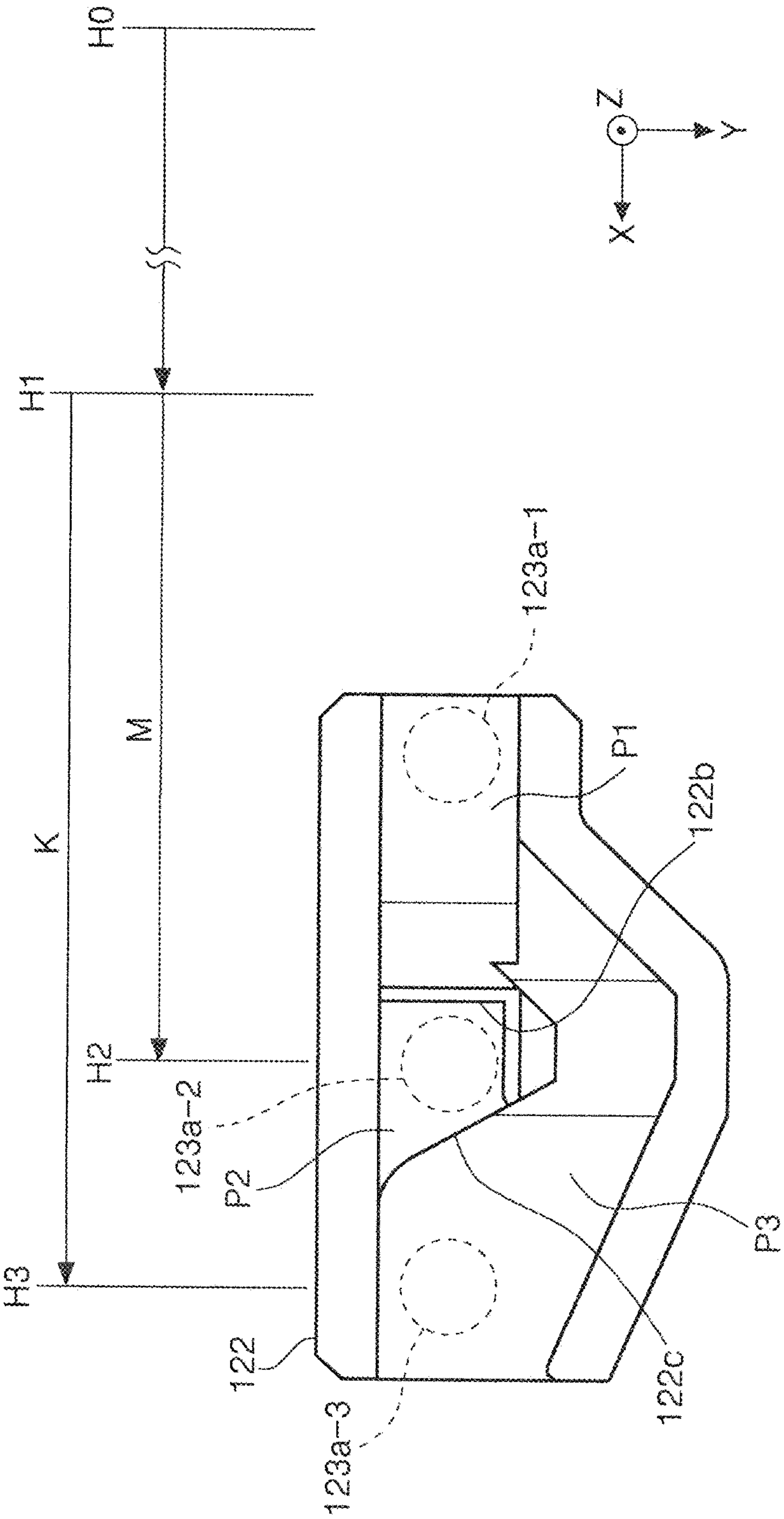
FIG. 23 is a diagram showing a position and a movement amount of a carriage with respect to a cam.

In FIG. 23, positions H0, H1, H2, and H3 are positions of the carriage 3. The position H0 is a home position of the carriage 3, and is set at an end portion in the −X direction. In the print standby state, the carriage 3 is located at the home position H0.

Figure 22:
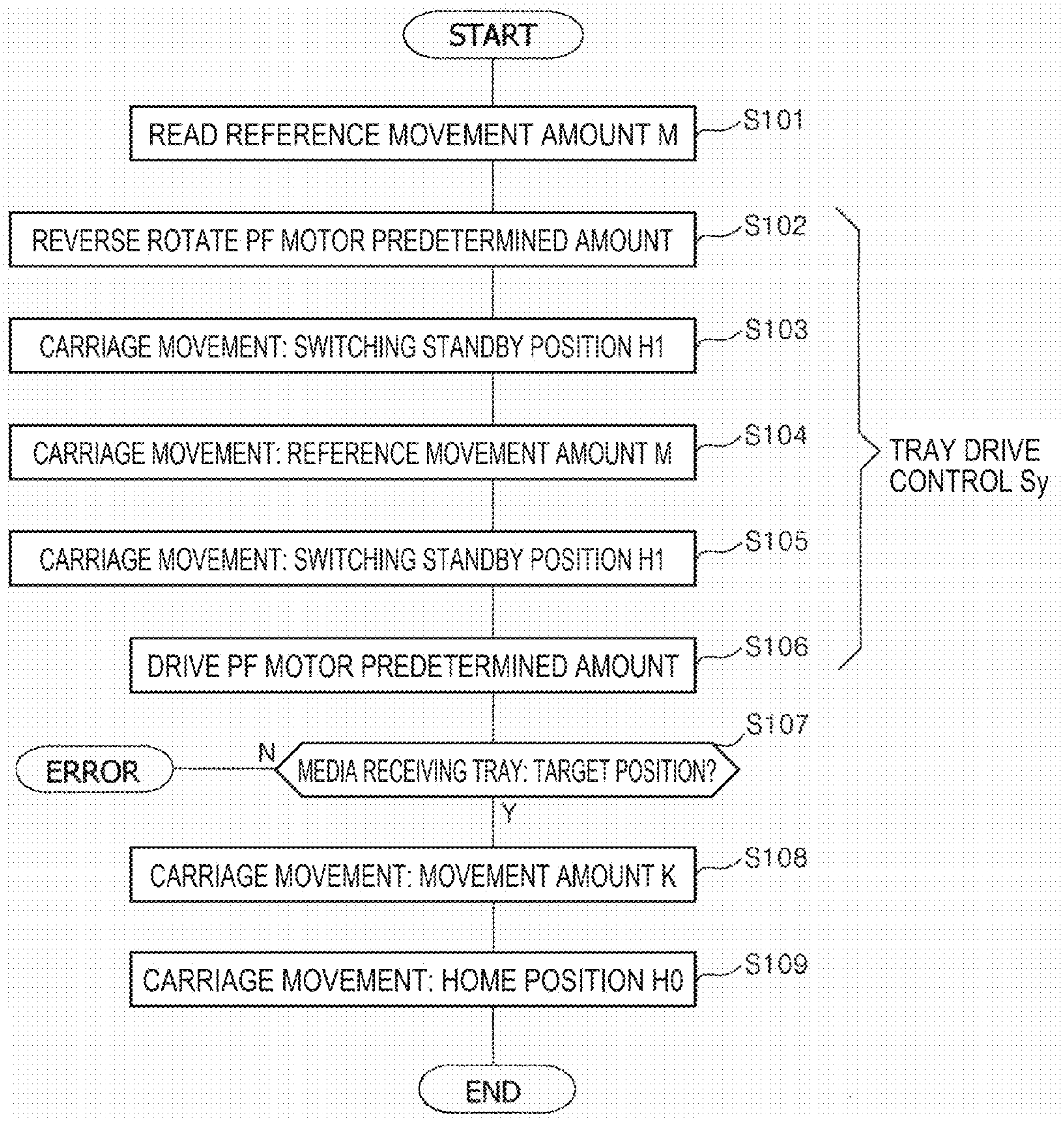
FIG. 22 is a flowchart showing a flow of a process when the medium receiving tray is displaced.

The above positions will be further described below with reference to FIG. 22. FIG. 22 is a flowchart illustrating a flow of a process when the medium receiving tray 5 is displaced.

The control section 200 reads the reference movement amount M from the non-volatile memory 203 (refer to FIG. 21) (step S101). The reference movement amount M constitutes the control parameters 205 (refer to FIG. 21). The reference movement amount M will be described later.

Next, the control section 200 rotates the PF motor 6 in the reverse direction by a predetermined amount (step S102).

By this, the power transmission section 100 is switched from the state ST1 to the state ST2 in FIG. 13.

Next, the control section 200 moves the carriage 3 to the switching standby position H1 in FIG. 23 (step S103). The switching standby position H1 is a position where the carriage 3 waits when the power transmission section 100 is switched from the power non-transmission state to the power transmission state or from the power transmission state to the power non-transmission state. In a state in which the carriage 3 is located at the switching standby position H1, the carriage 3 is not in contact with the tip section 121*a* of the switching lever section 121 (see FIG. 13).

Next, the control section 200 moves the carriage 3 from the switching standby position H1 in the +X direction by the reference movement amount M (step S104). The reference movement amount M is a movement amount of the carriage 3 for moving the pin 123*a* from the first cam surface P1 to the second cam surface P2.

In FIG. 23, a reference numeral 123*a*-1 indicates the pin 123*a* positioned on the first cam surface P1, and a reference numeral 123*a*-2 indicates the pin 123*a* moved in the +X direction by the movement of the carriage 3 by the reference movement amount M.

Assuming that the position of the holding section 123 when the pin 123*a* is located at the first cam surface P1 is a first position and the position of the holding section 123 when the pin 123*a* is located at the second cam surface P2 is a second position, the reference movement amount M can also be referred to as a movement amount of the carriage 3 for moving the holding section 123 from the first position to the second position.

Next, the control section 200 returns the carriage 3 to the switching standby position H1 (step S105). By this, the carriage 3 moves away from the switching lever section 121, and thus the pin 123*a* is moved in the −X direction by the pressing force of the coil spring 124 (refer to FIG. 13). However, since the pin holding section 122*b* is present in the −X direction relative to the pin 123*a*, the pin 123*a* is caught by the pin holding section 122*b* and is held by the second cam surface P2. By this, the power transmission section 100 is maintained in the power transmission state.

Next, the control section 200 drives the PF motor 6 by a predetermined amount to displace the medium receiving tray 5 (step S106). As an example, in the present embodiment, the medium receiving tray 5 is displaced in the +Y direction by the forward rotation of the PF motor 6, and the medium receiving tray 5 is displaced in the −Y direction by the reverse rotation of the PF motor 6. That is, when the medium receiving tray 5 is to be displaced from the storage position to the protruding position, the PF motor 6 is driven in the forward direction, and when the medium receiving tray 5 is to be displaced from the protruding position to the storage position, the PF motor 6 is driven in the reverse direction.

Note that the above-described steps S102 to S106 may be used as the tray drive control Sy in the following description.

Next, the control section 200 determines whether or not the medium receiving tray 5 was displaced to the target position (step S107), and in a case where the medium receiving tray 5 was switched to the target position (Yes in step S107), the control section 200 moves the carriage 3 from the switching standby position H1 in the +X direction by the movement amount K (step S108). The movement amount K is a movement amount of the carriage 3 for moving the pin 123*a* from the second cam surface P2 to the guide path P3 as shown in FIG. 23.

Then, the control section 200 moves the carriage 3 to the home position H0 (step S109).

Note that when the medium receiving tray 5 is not displaced to the target position in step S107 (No in step S107), the control section 200 performs error processing. Error processing in this case includes, for example, displaying an error message on the operation panel 210.

Here, even if the carriage 3 is moved by the reference movement amount M by step S104, the pin 123*a* may not appropriately move to the second cam surface P2 due to component tolerances, assembly errors, or the like.

Figure 24:
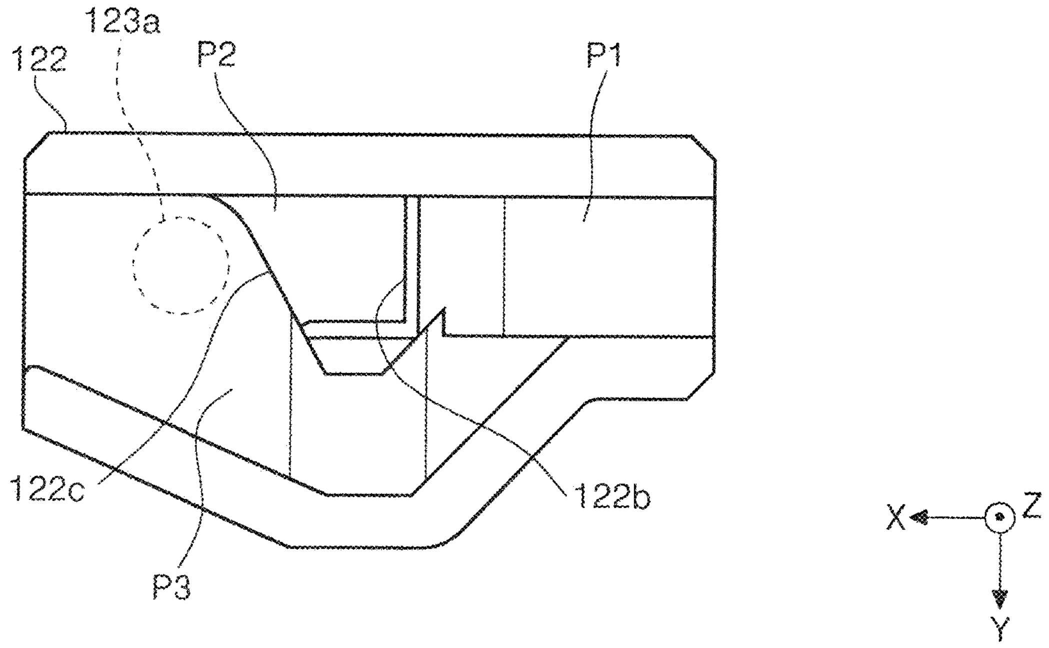
FIG. 24 is a view showing the position of a pin in a cam.

As an example, the position of the pin 123*a* shown in FIG. 24 is a case where the pin 123*a* moved too far in the +X direction from an appropriate position as a result of moving the carriage 3 by the reference movement amount M. Here, the appropriate position of the pin 123*a* is a position where the pin 123*a* is completely in contact with the second cam surface P2, as shown by the reference numeral 123*a*-2 in FIG. 23, by having a predetermined distance between the pin 123*a* and the pin holding section 122*b* and also having a predetermined distance between the pin 123*a* and the step section 122*c*.

As illustrated in FIG. 24, when the pin 123*a* is moved further in the +X direction than the appropriate position as a result of moving the carriage 3 by the reference movement amount M, the pin 123*a* returns to the first cam surface P1, and thus the power transmission section 100 is not switched to the power transmission state and the medium receiving tray 5 cannot be driven.

In order to correct such an inappropriate movement of the pin 123*a*, the control section 200 includes a correction mode for correcting the reference movement amount M of the carriage 3 for moving the pin 123*a* from the first cam surface P1 to the second cam surface P2, and can execute the correction mode.

The correction mode will be described below with reference to mainly FIGS. 26A and 26B and other figures.

Note that the correction mode is performed in a manufacturing process of the recording device 1, for example. However, it is needless to say that the processing may be executable in a user environment.

Note that the following numerical values can be adopted as parameters used below, for example. These parameters are held in the non-volatile memory 203 as the control parameters 205 (see FIG. 21). Note that the number of steps is the number of pulses transmitted from the linear encoder 212 (see FIG. 21).

Initial reference movement amount M: 66 (steps)
Adjustment amount ma: 2 (steps)
Adjustment amount mb: 10 (steps)
Adjustment amount mc: 6 (steps)
Threshold Sd: 46 (steps)
Adjustment amount mf: 32 (steps)
Number of retries Na: 10

In the correction mode, the control section 200 sets the retry counter N to zero (step S201), and then reads the reference movement amount M from the non-volatile memory 203 (step S202).

The reference movement amount M may be reduced by a process that will be described later, but when the correction mode is performed first, the reference movement amount M is an initial value (66 (steps)). In a case where the correction mode has already been performed, a problem occurs when the reference movement amount M is too small. Although this will be described later, if the read reference movement amount M is larger than the threshold value Sd ("Yes" in step S203), the control section 200 proceeds to step S205. The case of a No determination in step S203 will be described later.

Next, the control section 200 executes the tray drive control Sy for displacing the medium receiving tray 5 to the protruding position (step S205). As described with reference to FIG. 22, the tray drive control Sy is configured by steps S102 to S106 in FIG. 22. Note that before the correction mode is started, the medium receiving tray 5 is at the storage position.

As a result of step S205, when the medium receiving tray 5 is correctly displaced to the protruding position (Yes in step S208), the control section 200 refers to the retry counter N (step S209). As a result, when the retry counter N is zero (No in step S209), the process is performed from position A in FIG. 26B. This will be described later.

When the retry counter N is larger than zero (Yes in step S209), the reference movement amount M has been adjusted at least once, and thus the control section 200 sets an amount obtained by subtracting the adjustment amount mc from the reference movement amount M as the new reference movement amount M (step S210), and stores the new reference movement amount M in the non-volatile memory 203 (step S211). The adjustment amount mc will be described later.

When the result of step S208 is No, that is, when the medium receiving tray 5 is not correctly displaced to the protruding position, the control section 200 increments the retry counter N (step S212). If, as a result, the retry counter N exceeds the number of retries Na (Yes in step S213), the control section 200 performs error processing (step S214). Error processing in this case includes, for example, displaying an error message on the operation panel 210. Note that following the error processing, the control section 200 stores the latest reference movement amount M in the non-volatile memory 203 (step S211). Note that the operator can receive the error message and adjust the process. For example, the state of the pin 123 and the cam 122 can be checked, and the relative position adjustment of the pin 123 and the cam 122, the replacement of parts, and the like can be performed.

When the retry counter N does not exceed the number of retries Na (No in step S213), the control section 200 sets an amount obtained by subtracting the adjustment amount ma from the reference movement amount M as a new reference movement amount M (step S215), and performs step S205 and subsequent steps again.

The adjustment amount ma will be described. The failure in the driving of the medium receiving tray 5 is considered to be caused by the pin 123*a* in the power transmission section 100 having moved too far in the +X direction from the second cam surface P2. For example, the position of the pin 123*a* shown in FIG. 24. However, since the extent to which the pin 123*a* has moved too far from the second cam surface P2 is not clear, the control section 200 performs a retry (step S205) while gradually reducing the reference movement amount M. Therefore, the adjustment amount ma is a minute amount, and the adjustment amount ma is 2 (steps) with respect to the initial reference movement amount M (66 (steps)) as described above. Of course, the adjustment amount ma may be set to other values as appropriate.

Figure 25:
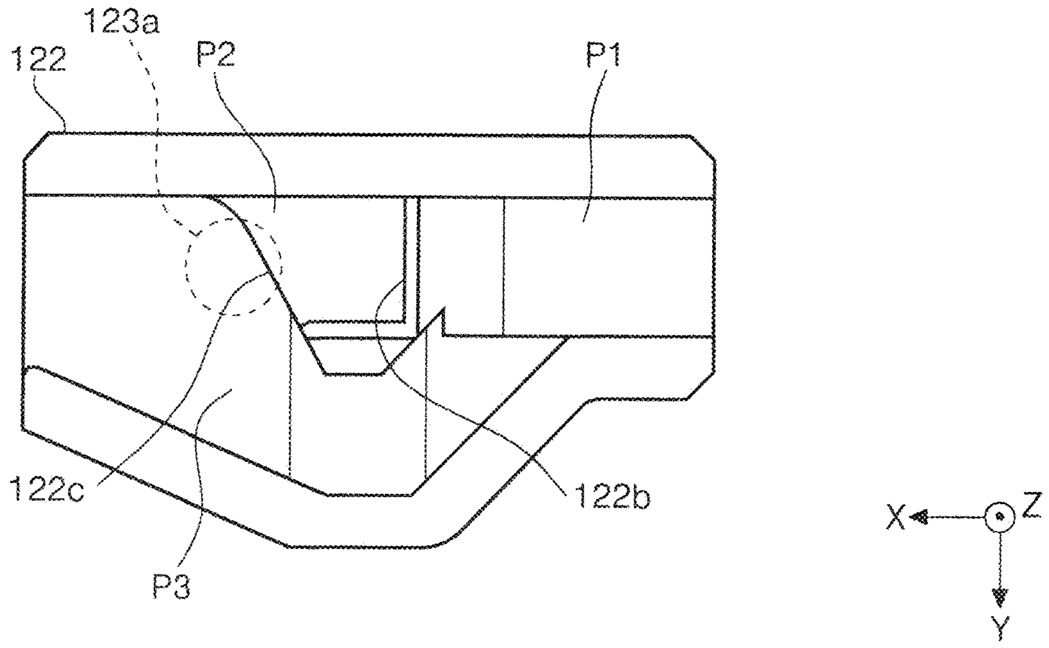
FIG. 25 is a view showing the position of a pin in a cam.

When the medium receiving tray 5 is successfully driven as a result of the retry while gradually reducing the reference movement amount M, it is considered that the pin 123*a* barely remains on the second cam surface P2 as shown in FIG. 25. Therefore, in this case, in order to position the pin 123*a* at an appropriate position of the second cam surface P2 as in the pin 123*a*-2 shown in FIG. 23, the control section 200 sets an amount obtained by subtracting the adjustment amount mc from the reference movement amount M as a new reference movement amount M (step S210), and stores the new reference movement amount M in the non-volatile memory 203 (step S211). In this manner, the adjustment amount mc is an amount for positioning the pin 123*a* at an appropriate position of the second cam surface P2.

Next, a case where the result in step S209 is "No" will be described. In this case, since the retry counter N is zero, the medium receiving tray 5 is successfully driven for the first try without adjusting the reference movement amount M even once. In this case, as shown in FIG. 25, it is also conceivable that the pin 123*a* barely remains on the second cam surface P2. Alternatively, it is also conceivable that the pin 123*a* has just got over the pin holding section 122*b*. It is not desirable that the pin 123*a* is positioned at a high unreliability position in this manner.

Therefore, when step S209 is "No", the reference movement amount M is increased so that the pin 123*a* reliably excessively moves in the +X direction from the second cam surface P2. Step S220 in FIG. 26B corresponds to this, and the control section 200 sets an amount obtained by adding the adjustment amount mb to the reference movement amount M as a new reference movement amount M. Then, the control section 200 executes the tray driving control Sy for displacing the medium receiving tray 5 to the storage position using the new reference movement amount M (step S225). However, step S209 may be omitted.

Figure 26A:
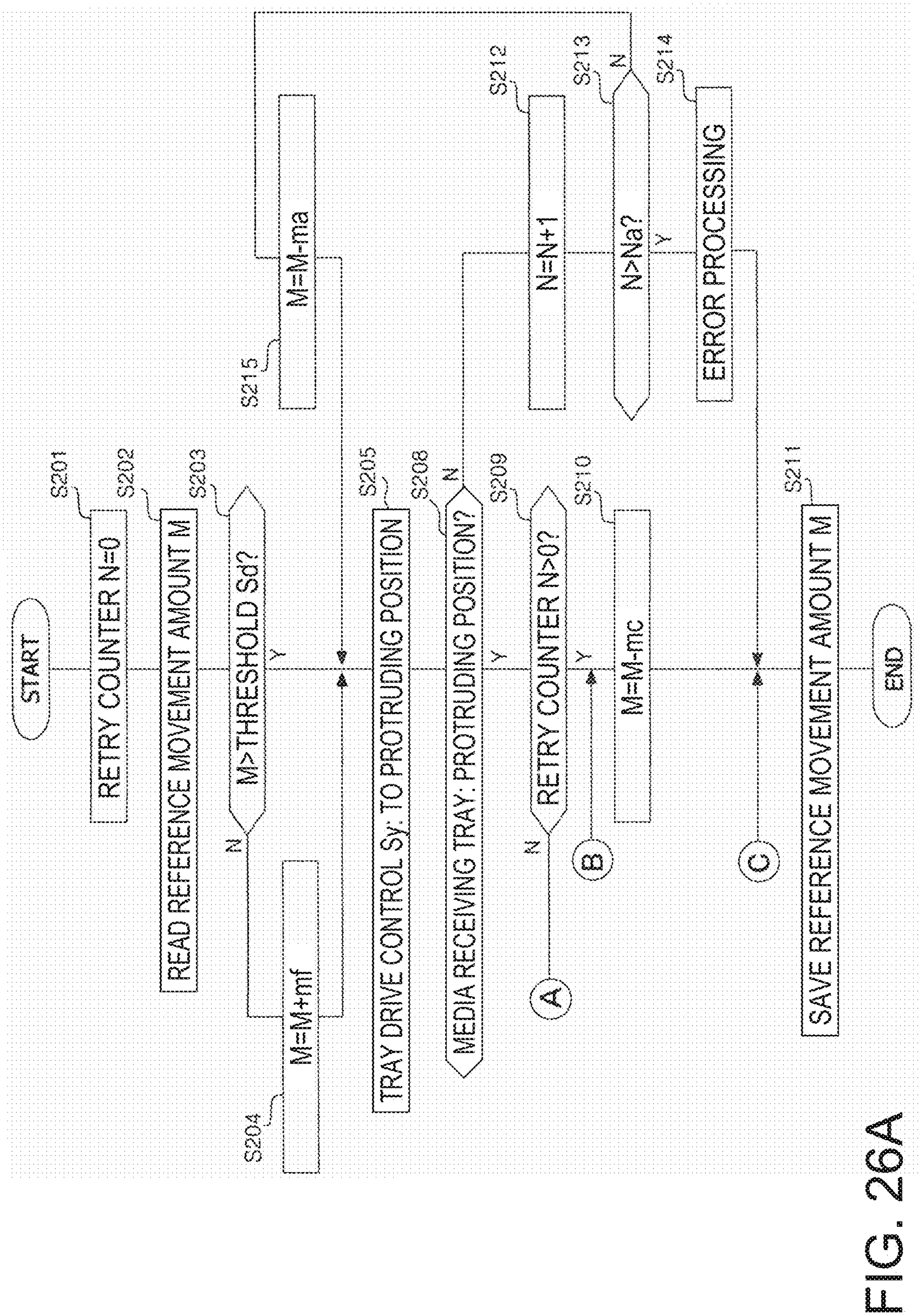
FIG. 26A is a flowchart showing the control flow of the correction mode.
Figure 26B:
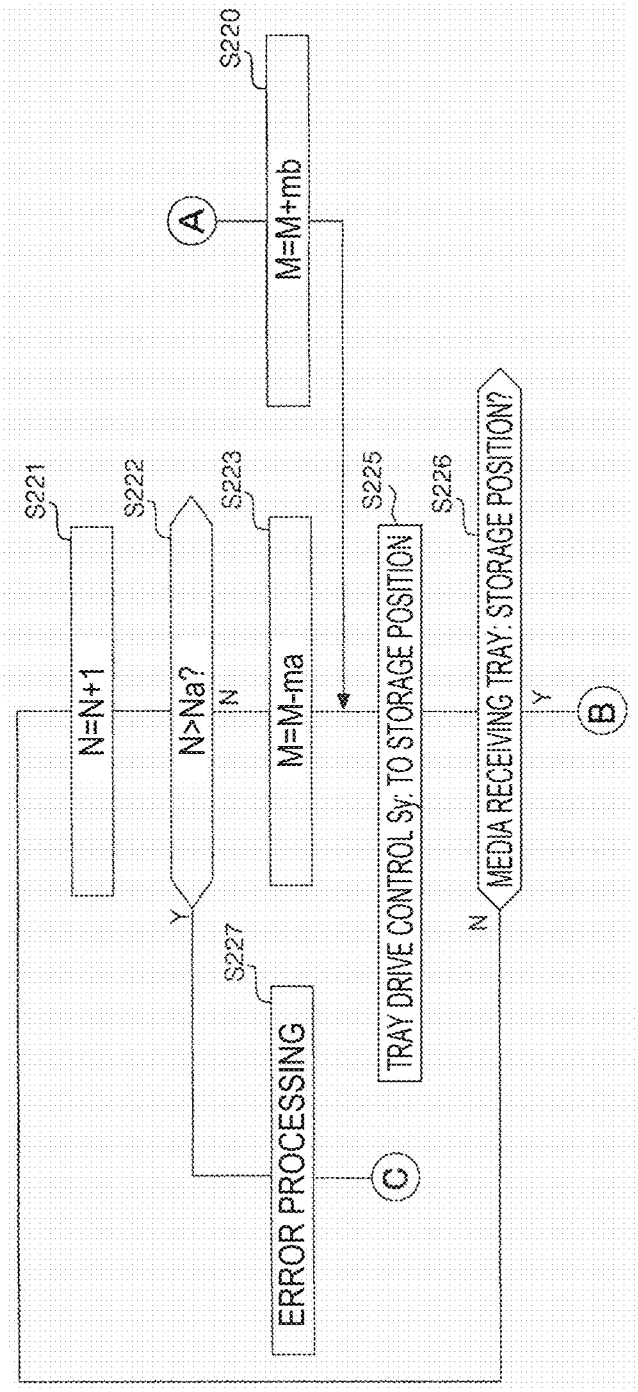
FIG. 26B is a flowchart showing the control flow of the correction mode.

As a result of step S225, when the medium receiving tray 5 is correctly displaced to the storage position ("Yes" in step S226), the process is performed from position B in FIG. 26A.

When the determination result in step S226 is "No", that is, when the medium receiving tray 5 is not correctly displaced to the storage position, the control section 200 increments the retry counter N (step S221). As a result, when the retry counter N exceeds the number of retries Na ("Yes"

in step S222), the control section 200 performs error processing (step S227). Error processing in this case includes, for example, displaying an error message on the operation panel 210. Then, the processing is performed from the position C in FIG. 26A.

When the retry counter N does not exceed the number of retries Na ("No" in step S222), the control section 200 sets an amount obtained by subtracting the adjustment amount ma from the reference movement amount M as a new reference movement amount M (step S223), and performs step S225 and subsequent steps again as a retry operation.

Next, step S204 will be described. When the correction mode is performed first, the reference moving amount M is the initial value (66 (steps)), but when the tray drive control fails as described above, the reference moving amount M is reduced (step S215). Therefore, when the retry counter N reaches the number of retries Na, the reference movement amount M becomes the minimum value. In the case of the present embodiment, the maximum value of the retry counter N is 10, and therefore the minimum value of the reference movement amount M is 46.

In this case, the control section 200 performs error processing (step S214), and stores the latest reference movement amount M (step S211). However, when the correction mode is performed again, the reference movement amount M is the smallest value, and thus there is a concern that the pin 123*a* cannot reach the second cam surface P2. In a case where the tray driving control fails even when the retry operation is performed the maximum number of times, the reference movement amount M is insufficient from the beginning, and there is a concern that the pin 123*a* has not reached the second cam surface P2.

Therefore, when the read reference movement amount M does not exceed the reference movement amount Sd ("No" in step S203), the control section 200 sets an amount obtained by adding the adjustment amount mf to the reference movement amount M as a new reference movement amount M (step S204). By this, it can be expected that the pin 123*a* reliably reaches the second cam surface P2.

As described above, the power transmission section 100 includes the holding section 123 that switches from the power non-transmission state to the power transmission state by moving from the first position to the second position in the +X direction with respect to the first position in accordance with the movement of the carriage 3 in the +X direction, and the cam mechanism 131 that holds the holding section 123 at the second position.

The cam mechanism 131 includes a cam 122 having a cam surface 122*a*, and a pin 123*a*, which is a part that moves integrally with the holding section 123 and that moves while being in contact with the cam surface 122*a*.

The cam surface 122*a* includes a first cam surface P1 with which the pin 123*a* comes into contact when the holding section 123 is located at the first position, a second cam surface P2 wherein the holding section 123 holds the pin 123*a* so that the pin 123*a* is located at the second position, and a guide path P3 that guides the pin 123*a* to the first cam surface P1 when the pin 123*a* separates from the second cam surface P2 in the +X direction.

The control section 200 is configured to execute a correction mode for correcting the reference movement amount M of the carriage 3 for moving the holding section 123 from the first position to the second position.

Figure 21:
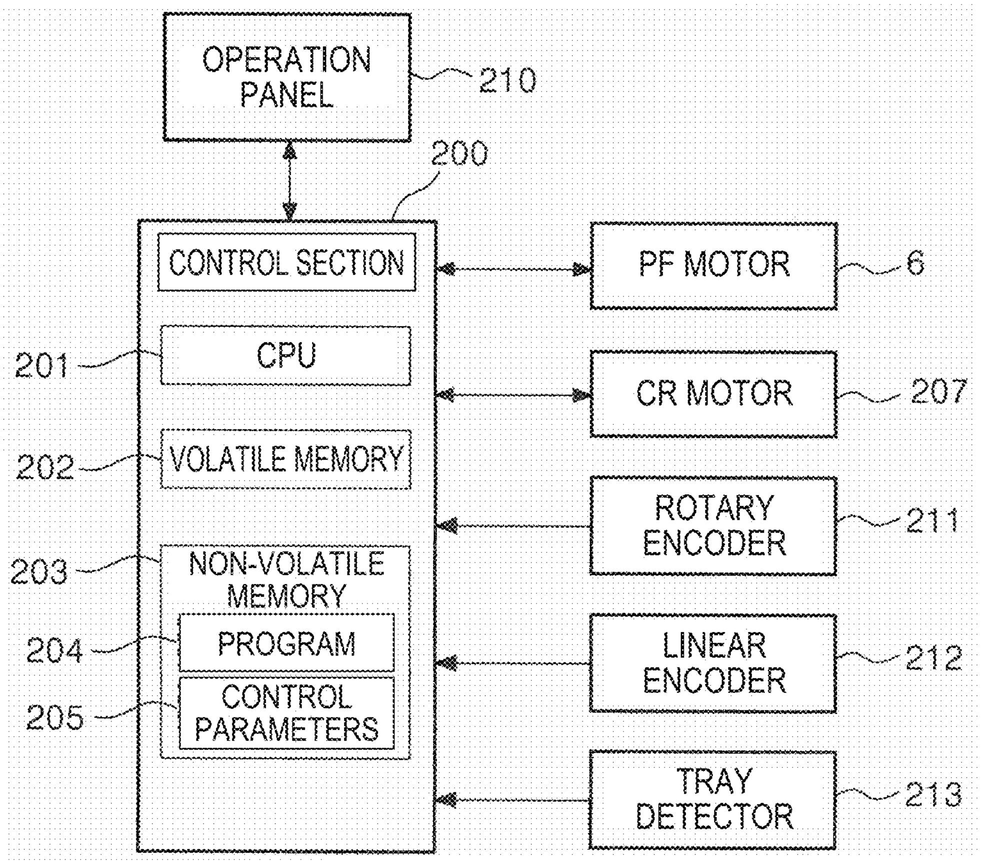
FIG. 21 is a block diagram showing a control system of the recording device.

A control program of the recording device 1 according to the present embodiment, which realizes the correction mode, is included in the program 204 (refer to FIG. 21).

A method of controlling the recording device 1 according to the present embodiment is realized by the control section 200 executing the program 204 (refer to FIG. 21).

The correction mode includes a power switching step (tray drive control Sy) for moving the carriage 3 based on the reference movement amount M. The correction mode includes a retry step of setting an amount obtained by subtracting the adjustment amount ma from the reference movement amount M as the reference movement amount M after adjustment (steps S215 and S223) and performing the power switching step when the power transmission section 100 is not switched from the power non-transmission state to the power transmission state as a result of the power switching step. The retry step is a step S215 after step S205 is performed or a step S223 after step S225 is performed.

The correction mode includes a reference movement amount correction step (including steps S210 and S211) of holding an amount obtained by subtracting the adjustment amount mc from the reference movement amount M after adjustment as a new reference movement amount M when the power transmission section 100 is switched from the power non-transmission state to the power transmission state as a result of the retry step.

Such a correction mode can prevent a failure in switching the power transmission of the power transmission section 100.

When the power transmission section 100 is switched from the power non-transmission state to the power transmission state as a result of the retry step, the pin 123*a* may be located at a position where the pin 123*a* is located on the second cam surface P2 but may enter the guide path P3, that is, an unstable position (see FIG. 25). In such a case, there is a high possibility that the switching of the power transmission will fail in the future.

However, according to the correction mode, when the power transmission section 100 is switched from the power non-transmission state to the power transmission state as a result of the retry step, the amount obtained by subtracting the adjustment amount mc from the reference movement amount M after the adjustment is held as the new reference movement amount M, and thus the pin 123*a* can be moved to a stable position on the second cam surface P2. As a result, it is possible to suppress a failure in switching the power transmission.

Note that it is desirable that the initial reference movement amount M (66 (steps)) is an amount by which the pin 123*a* reliably passes through the pin holding section 122*b* in the +X direction. Furthermore, the initial reference movement amount M (66 (steps)) is preferably an amount by which the pin 123*a* is deviated from the second cam surface P2 in the +X direction.

The correction mode includes an adjustment step (steps S220 and S225) of performing the power switching step with a movement amount obtained by adding the adjustment amount mb to the reference movement amount M as the reference movement amount M after adjustment when the power transmission section 100 is switched from the power non-transmission state to the power transmission state as a result of the first power switching step.

In the correction mode, when the power transmission section 100 is not switched from the power non-transmission state to the power transmission state as a result of the adjustment step ("No" in step S226), the control section 200 proceeds to the retry step. The retry step is step S225 after step S223 is executed.

When the power transmission section 100 is switched from the power non-transmission state to the power transmission state as a result of the first power switching step, the pin 123*a* may be located at a position where, as shown in FIG. 25, the pin 123*a* is located on the second cam surface P2 but may enter the guide path P3, that is, at an unstable position. In such a case, there is a high possibility that the switching of the power transmission will fail in due course, and therefore, it is desirable to adjust the reference movement amount M.

However, in the correction mode, when the power transmission section 100 is switched from the power non-transmission state to the power transmission state as a result of the first power switching step ("No" in step S209), the power switching step is performed with the movement amount obtained by adding the adjustment amount mb to the reference movement amount M as the reference movement amount M after adjustment. By this, it can be expected that the pin 123*a* is excessively moved in the +X direction from the second cam surface P2 and will enter the guide path P3. That is, the switching of the power transmission can be intentionally made to fail.

Then, by performing the retry step and the reference movement amount correction step, it is possible to suppress a failure in switching the power transmission.

Note that it is desirable that the adjustment amount mb is an amount by which the pin 123*a* is designed to reliably excessively move to the second cam surface P2 in the +X direction and enter the guide path P3. In detail, the adjustment amount mb is preferably an amount obtained by adding a predetermined margin to a movement amount for the pin 123*a* to enter the guide path P3 from a state where the pin 123*a* is located at the most −X direction side of the second cam surface P2.

In the correction mode, when the power transmission section 100 is not switched from the power non-transmission state to the power transmission state as a result of the retry step (step S205 after step S215, or step S225 after step S223) ("No" in step S208, or "No" in step S226), the control section 200 repeatedly executes the retry step up to the retry count Na (steps S212, S213, S221, S222).

When the power transmission section 100 is not switched from the power non-transmission state to the power transmission state even after the retry step is executed the number of retries Na ("Yes" in step S213, "Yes" in step S222), the control section 200 determines that an error has occurred and ends the correction mode.

When the power transmission section 100 is not switched from the power non-transmission state to the power transmission state even after the retry step is repeated, there is a possibility that a mechanical abnormality has occurred that cannot be handled by some control. In such a case, repeating the retry step more than necessary leads to unnecessary time consumption. However, according to the present embodiment, when the power transmission section 100 is not switched from the power non-transmission state to the power transmission state as a result of the retry step, the retry step is repeatedly executed with the number of retries Na as a limit, and thus it is possible to suppress consumption of unnecessary time.

In the correction mode, when the power transmission section 100 is not switched from the power non-transmission state to the power transmission state even if the retry step is executed the number of retries Na, the control section 200 holds the latest reference movement amount M as a new reference movement amount M (step S211 after step S214 or step S211 after step S227).

Further, when the control section 200 executes the correction mode again, the control section 200 compares the reference movement amount M with the reference value Sd, and when the reference movement amount M is equal to or less than the reference value Sd ("No" in step S203), the control section 200 sets an amount obtained by adding the adjustment amount mf to the reference movement amount M as a new reference movement amount M (step S204), and executes the correction mode.

By this, when it is considered that the pin 123*a* cannot reach the second cam surface P2, it can be expected that the pin 123*a* reaches the second cam surface P2 from the first cam surface P1, and the reference movement amount M can be corrected to an appropriate value by the correction mode.

In the embodiment, the power transmission section 100 includes the gear 105 as the first gear that transmits the gear of the PF motor 6 to the medium receiving tray 5, and the gear 104 that is movable in the movement direction of the carriage 3, and disengages from the gear 105 when the holding section 123 is positioned at the first position, and engages with the gear 105 when the holding portion 123 is positioned at the second position.

The power transmission section 100 can switch between the power non-transmission state and the power transmission state with such a simple configuration.

In the present embodiment, a driven portion which is driven by the PF motor 6 as a power source is the medium receiving tray 5.

However, the driven portion is not limited to the medium receiving tray 5, and may be another movable portion.

The power source is not limited to the PF motor 6, and may be another motor.

In the present embodiment, the recording device 1 includes a tray detection section 213 that detects the position of the medium receiving tray 5. The control section 200 determines whether the power transmission section 100 is in the power transmission state or the power non-transmission state based on the detection information of the tray detection section 213 213.

This eliminates the need to provide a dedicated detection mean for detecting the state of the power transmission section 100, and thus suppresses an increase in the cost of the apparatus.

However, it is needless to say that a dedicated detection means for detecting the state of the power transmission section 100 may be provided. As an example, a rotary encoder can be provided on a gear that rotates when the power transmission state is established.

Alternatively, a detection means for detecting the position of the pin 123*a*, that is, the holding section 123 may be provided. In this case, it is particularly desirable to provide a means for detecting that the pin 123*a* is positioned at the second cam surface P2, that is, the holding section 123 is positioned at the second position. Thus, a failure in switching from the power non-transmission state to the power transmission state can be detected. As a means for detecting that the holding portion 123 is located at the second position, a contact type sensor that comes into contact with the holding portion 123 when the holding section 123 moves to the second position or a non-contact type sensor can be used.

In this case, it is desirable to detect that the pin 123*a* is located at the center of the second cam surface P2 in the X-axis direction. By this, as shown in FIG. 25, since it is possible to exclude a case where the pin 123*a* barely remains on the second cam surface P2 or a case where the pin 123*a* barely gets over the pin holding section 122*b*, so step S209 in FIG. 26A may be omitted.

Note that the correction mode is performed in the manufacturing process of the recording device 1 as an example as described above. In this case, the correction mode may be executable only from the external computer connected to the recording device 1. That is, the execution of the correction mode via the operation panel 210 may be disabled.

However, it is needless to say that the execution of the correction mode via the operation panel 210 may be enabled.

Hereinafter, other characteristic configurations of the recording device 1 will be described.

Figure 27:
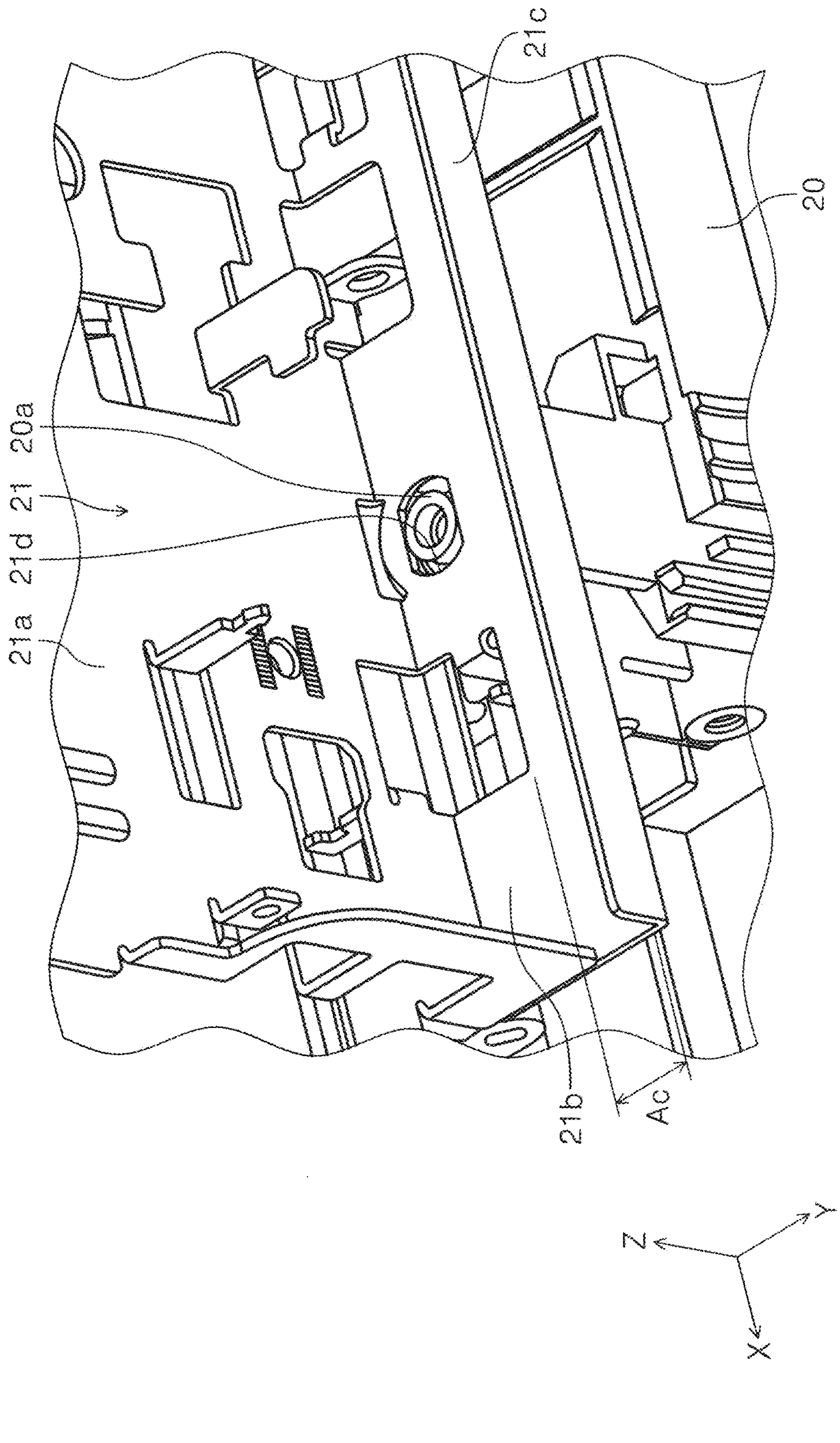
FIG. 27 is a perspective view of the base frame and the carriage guide frame, showing a state before both frames are fixed.
Figure 28:
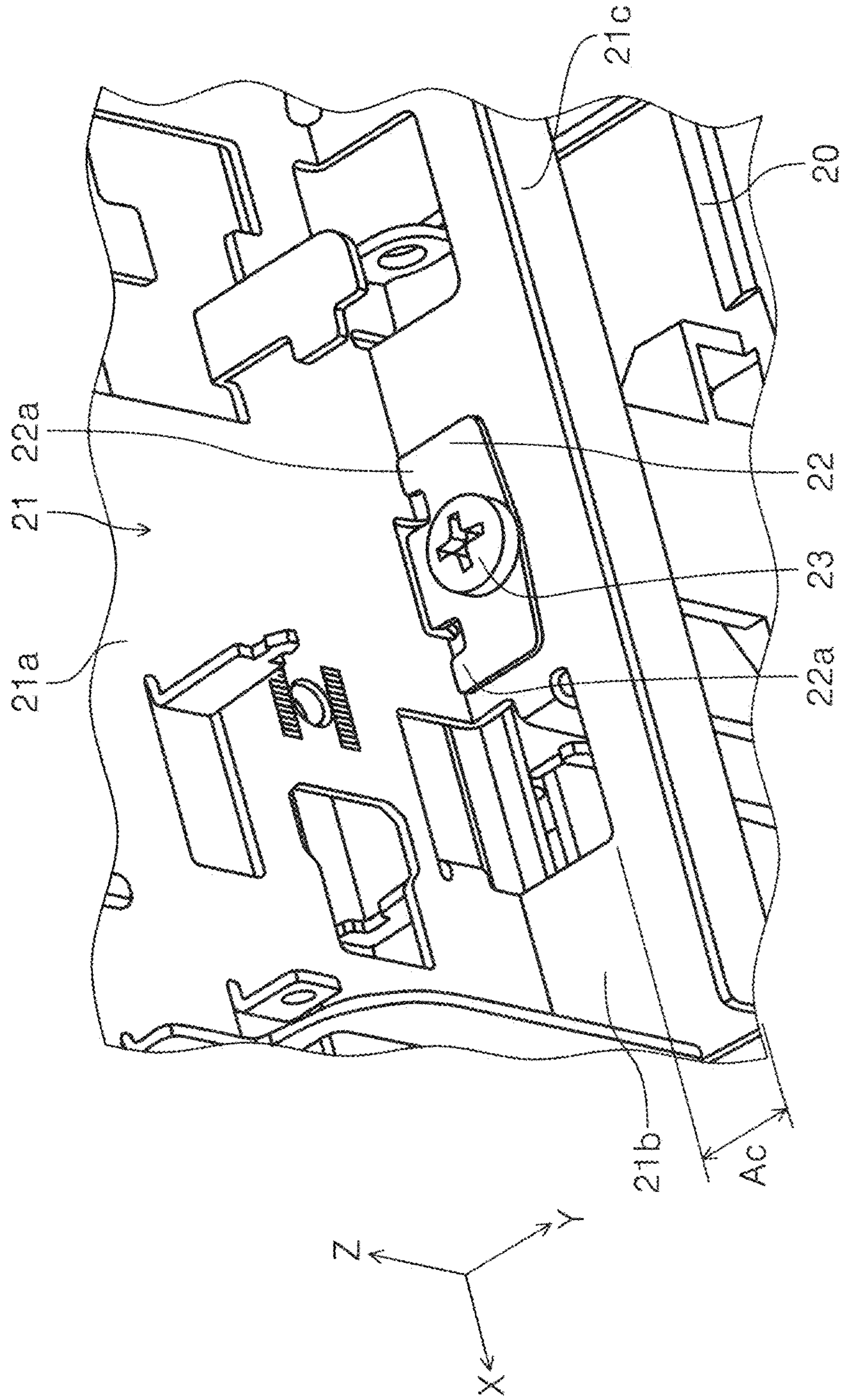
FIG. 28 is a perspective view of the base frame and the carriage guide frame, showing a state after both frames are fixed.

In FIGS. 27 and 28, reference numeral 20 denotes a base frame constituting a bottom portion of the recording device 1. Reference numeral 21 denotes a carriage frame that supports the carriage 3. The carriage frame 21 has a vertical frame section 21*a* forming a surface parallel to the X-Z plane, a horizontal frame section 21*b* forming a surface parallel to the X-Y plane, and a bending section 21*c* forming a surface parallel to the X-Z plane. The carriage 3 moves in the X-axis direction while sliding on the horizontal frame section 21*b*. A reference numeral Ac denotes a sliding area for the carriage 3 to slide.

The base frame 20 has a boss-shaped screw fixing section 20*a*. An elongated hole 21*d* elongated in the X-axis direction is formed in the horizontal frame section 21*b*, and the carriage frame 21 is fixed to the base frame 20 by inserting the screw fixing section 20*a* into the elongated hole 21*d* and fastening the screw 23 to the screw fixing portion 20*a*.

Here, in order to reliably fix the horizontal frame section 21*b* by the screw 23, it is desirable to use washers, but when general round washers are used, there is a concern that the round washers may enter the sliding area Ac and hinder the sliding of the carriage 3.

In this embodiment, therefore, the fixed frame 22 is interposed between the screw 23 and the horizontal frame section 21*b* as shown in FIG. 28. The fixed frame 22 is formed so that the edge in the +Y direction is located at substantially the same position as the outer periphery of the screw 23 so as not to protrude toward the sliding area Ac. The fixed frame 22 has a rotation stop section 22*a* as a portion engageable with the vertical frame section 21*a* of the carriage frame 21. The rotation stop section 22*a* is provided on both sides of the screw 23 in the X-axis direction. The torque applied when fastening the screw 23 causes the fixed frame 22 to rotate, but the rotation stop section 22*a* comes into contact with the vertical frame section 21*a*, thereby suppressing the fixed frame 22 from rotating. This allows the posture of the fixed frame 22 to be appropriately maintained, and suppress the fixed frame 22 from entering the sliding area Ac.

The present disclosure is not limited to the embodiments and modifications described above, various modifications are possible within the scope of the disclosure described in the claims, it is needless to say that they are also included in the scope of the present disclosure.

What is claimed is:

1. A recording device comprising:

a power source;

a power transmission section configured to be switched between a power transmission state in which power of the power source is transmitted to a driven section and a power non-transmission state in which power is not transmitted to the driven section;

a carriage that includes a recording section that performs recording on a medium and that is movable in a first direction intersecting a transport direction of the medium and in a second direction opposite to the first direction; and a control section that controls an operation of the carriage, wherein the power transmission section includes a switching section that, in accordance with movement of the carriage in the first direction, switches from the power non-transmission state to the power transmission state by moving from a first position to a second position that is in the first direction with respect to the first position and a cam mechanism configured to hold the switching section at the second position, the cam mechanism includes a cam having a cam surface, and a cam contact section that moves integrally with the switching section and moves while contacting the cam surface, the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the control section is configured to execute a correction mode for correcting a reference movement amount M of the carriage for moving the switching section from the first position to the second position, and the correction mode includes a power switching step of moving the carriage based on the reference movement amount M, a retry step of, when the power transmission section is not switched from the power non-transmission state to the power transmission state as a result of the power switching step, performing the power switching step with an amount obtained by subtracting an adjustment amount ma from the reference movement amount M after the adjustment as a reference movement amount M, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

2. The recording device according to claim 1, wherein when the power transmission section is switched from the power non-transmission state to the power transmission state as a result of performing the power switching step a first time, the correction mode includes an adjustment step of performing the power switching step with a movement amount obtained by adding an adjustment amount mb to the reference movement amount M after the adjustment as a reference movement amount M, and the control section shifts to the retry step when the power transmission section is not switched from the power non-transmission state to the power transmission state as a result of the adjustment step in the correction mode.

3. The recording device according to claim 1, wherein when the power transmission section is not switched from the power non-transmission state to the power transmission state as a result of the retry step in the correction mode, the control section repeatedly executes the retry step with a retry number Na as a limit, and when the power transmission section is not switched from the power non-transmission state to the power transmission state even after the retry step is executed the number of retries Na, the control section determines that an error has occurred and ends the correction mode.

4. The recording device according to claim 3, wherein when the power transmission section is not switched from the power non-transmission state to the power transmission state even if the retry step is executed the number of retries Na in the correction mode, the control section holds the latest reference movement amount M as a new reference movement amount M, and further, when the control section executes the correction mode again, the control section compares the reference movement amount M with a threshold value Sd, and when the reference movement amount M is equal to or less than the threshold value Sd, the control section executes the correction mode by setting an amount obtained by adding an adjustment amount mf to the reference movement amount M as a new reference movement amount M.

5. The recording device according to claim 1, wherein the power transmission section includes a first gear configured to transmit a gear of the power source to the driven section; and a second gear that is movable in a movement direction of the carriage, disengages from the first gear when the switching section is located at the first position, and engages with the first gear when the switching section is located at the second position.

6. The recording device according to claim 1, further comprising:

a discharge section that discharges the medium on which recording has been performed by the recording section; and a medium receiving tray that receives the medium discharged by the discharge section, the medium receiving tray being displaceable between a storage position and a protruding position protruding from the storage position in a discharge direction of the medium, wherein the driven section is the medium receiving tray.

7. The recording device according to claim 6, further comprising:

a tray detection section that detects a position of the medium receiving tray, wherein the control section determines whether the power transmission section is in the power transmission state or the power non-transmission state based on detection information of the tray detection section.

8. A non-transitory computer-readable storage medium storing a computer program that is executed by a control section of a recording device, the recording device including a power source;

a power transmission section configured to be switched between a power transmission state in which power of the power source is transmitted to a driven section and a power non-transmission state in which power is not transmitted to the driven section;

a carriage that includes a recording section that performs recording on a medium and that is movable in a first direction intersecting a transport direction of the medium and in a second direction opposite to the first direction; and the control section that controls an operation of the carriage, wherein the power transmission section includes a switching section that, in accordance with movement of the carriage in the first direction, switches from the power non-transmission state to the power transmission state by moving from a first position to a second position that is in the first direction with respect to the first position, and a cam mechanism configured to hold the switching section at the second position, the cam mechanism includes a cam having a cam surface, and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the computer program comprising:

executing a correction mode by a computer to correct a reference movement amount M of the carriage for moving the switching section from the first position to the second position, the correction mode including, executing by a computer, a power switching step of moving the carriage based on the reference movement amount M, a retry step of, when the power transmission section is not switched from the power non-transmission state to the power transmission state as a result of the power switching step, performing the power switching step with an amount obtained by subtracting an adjustment amount ma from the reference movement amount M after the adjustment as a reference movement amount M, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

9. A recording device control method for a recording device that includes a power source;

a power transmission section configured to be switched between a power transmission state in which power of the power source is transmitted to a driven section and a power non-transmission state in which power is not transmitted to the driven section;

a carriage that includes a recording section that performs recording on a medium and that is movable in a first direction intersecting a transport direction of the medium and in a second direction opposite to the first direction; and a control section that controls an operation of the carriage, wherein the power transmission section includes a switching section that, in accordance with movement of the carriage in the first direction, switches from the power non-transmission state to the power transmission state by moving from a first position to a second position that is in the first direction with respect to the first position, and a cam mechanism configured to hold the switching section at the second position, the cam mechanism includes a cam having a cam surface, and a cam contact section that moves integrally with the switching section and moves while contacting the cam surface, and the cam surface includes a first cam surface with which the cam contact section contacts when the switching section is located at the first position, a second cam surface that holds the cam contact section such that the switching section is located at the second position, and a guide path that guides the cam contact section on the first cam surface when the cam contact section is separated from the second cam surface in the first direction, the recording device control method comprising:

a correction mode for correcting a reference movement amount M of the carriage for moving the switching section from the first position to the second position, the correction mode including a power switching step of moving the carriage based on the reference movement amount M, a retry step of, when the power transmission section is not switched from the power non-transmission state to the power transmission state as a result of the power switching step, performing the power switching step with an amount obtained by subtracting an adjustment amount ma from the reference movement amount M after the adjustment as a reference movement amount M, and a reference movement amount correction step of, when the power transmission section is switched from the power non-transmission state to the power transmission state as a result of the retry step, holding an amount obtained by subtracting the adjustment amount mc from the reference movement amount M after the adjustment as a new reference movement amount M.

* * * * *